US010365952B2

(12) United States Patent
Koyanagi

(10) Patent No.: US 10,365,952 B2
(45) Date of Patent: Jul. 30, 2019

(54) LOAD DISTRIBUTION SYSTEM, APPARATUS, AND METHOD

(71) Applicant: FUJITSU LIMITED, Kawasaki-shi, Kanagawa (JP)

(72) Inventor: Yusuke Koyanagi, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 217 days.

(21) Appl. No.: 15/653,664

(22) Filed: Jul. 19, 2017

(65) Prior Publication Data

US 2018/0039517 A1 Feb. 8, 2018

(30) Foreign Application Priority Data

Aug. 2, 2016 (JP) ................................ 2016-152123

(51) Int. Cl.
*G06F 9/46* (2006.01)
*G06F 9/50* (2006.01)

(52) U.S. Cl.
CPC ........... *G06F 9/505* (2013.01); *G06F 9/5083* (2013.01); *G06F 9/46* (2013.01); *G06F 9/50* (2013.01)

(58) Field of Classification Search
CPC .......... G06F 9/505; G06F 9/5083; G06F 9/46; G06F 9/50
See application file for complete search history.

(56) References Cited

U.S. PATENT DOCUMENTS

2004/0103138 A1* 5/2004 Lamport ................ H04L 67/10 709/201
2006/0233342 A1 10/2006 Thione et al.

FOREIGN PATENT DOCUMENTS

JP 2006-268848 10/2006
JP 2008-269250 11/2008
JP 2013-114636 6/2013

* cited by examiner

*Primary Examiner* — Camquy Truong
(74) *Attorney, Agent, or Firm* — Staas & Halsey LLP

(57) ABSTRACT

A load-distribution system includes: a first computer to: determine a common portion of conditions among different models, and store one or more models in each of third computers that determines a state of an event, by applying a model stored in a built-in memory; and a second computer to: specify, from the third computers, a first third computer that stores a first model of the models including the identical-common portion, which corresponds to an attribute included in event information which has been input, specify, from the third computers, a second third computer that store a second model including a common portion identical to a common portion included in the first model, decide which one of the first third computer and the second third computer is caused to perform determining the state, and cause the decided one of the third computers to perform the processing of determining the state.

9 Claims, 22 Drawing Sheets

52

| EVENT ID | USER ID | WORKDAY/OFF DAY | AM/PM | TERMINAL ID | PLACE | MODEL ID | UNIQUE-PORTION POSITIONING NODE ID | DETERMINATION NODE ID | ATTRIBUTE a | ATTRIBUTE b | ATTRIBUTE c | ATTRIBUTE d |
|---|---|---|---|---|---|---|---|---|---|---|---|---|
| 1020 | 1 | WORKDAY | AM | 1 | OFFICE | 1 | 1 | 1 | 20 | 10 | 15 | 12 |

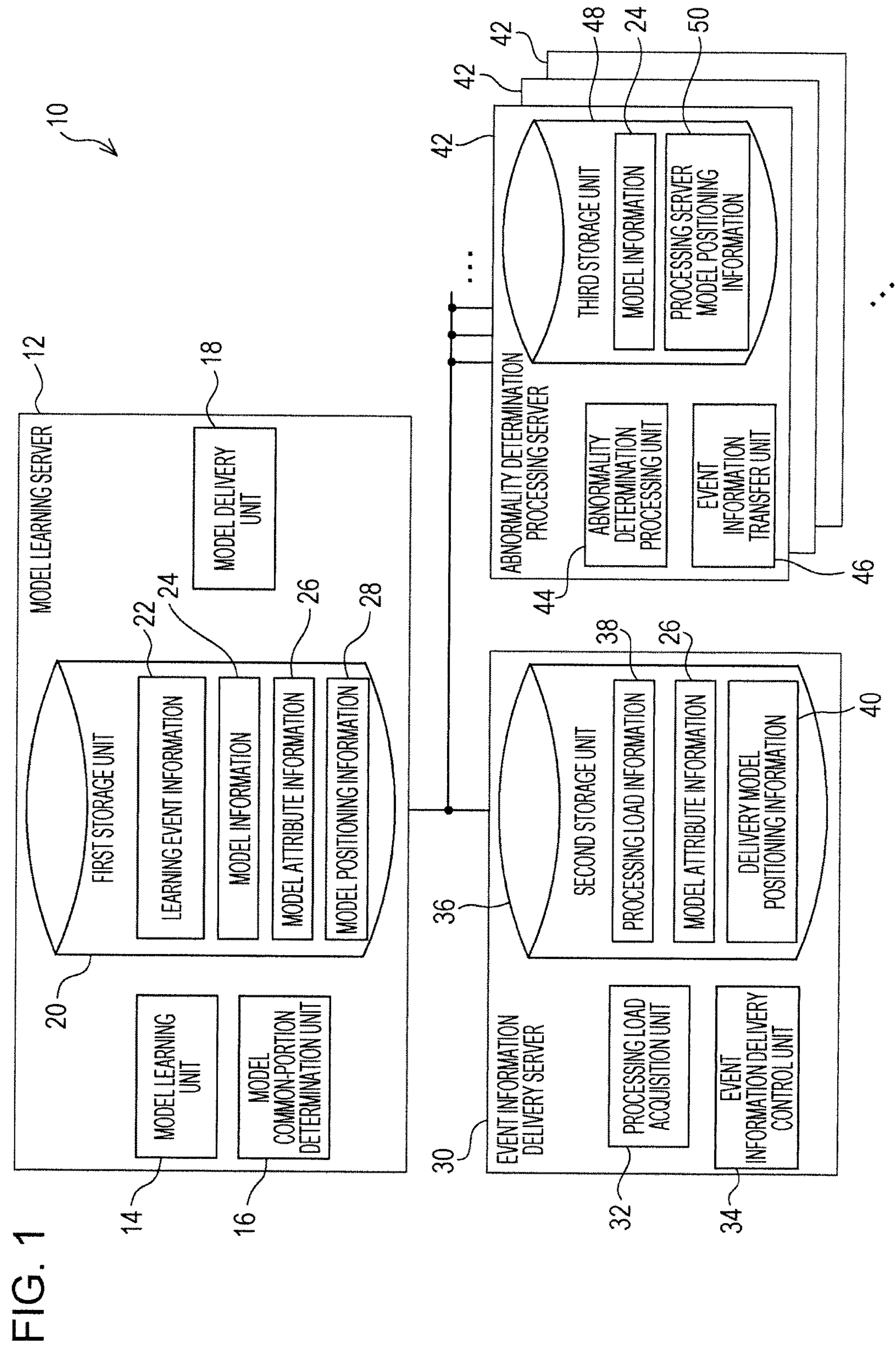
FIG. 1
10
MODEL LEARNING SERVER
12
MODEL LEARNING UNIT
14
MODEL COMMON-PORTION DETERMINATION UNIT
16
MODEL DELIVERY UNIT
18
FIRST STORAGE UNIT
20
LEARNING EVENT INFORMATION
22
MODEL INFORMATION
24
MODEL ATTRIBUTE INFORMATION
26
MODEL POSITIONING INFORMATION
28
EVENT INFORMATION DELIVERY SERVER
30
PROCESSING LOAD ACQUISITION UNIT
32
EVENT INFORMATION DELIVERY CONTROL UNIT
34
SECOND STORAGE UNIT
36
PROCESSING LOAD INFORMATION
38
MODEL ATTRIBUTE INFORMATION
26
DELIVERY MODEL POSITIONING INFORMATION
40
ABNORMALITY DETERMINATION PROCESSING SERVER
42
ABNORMALITY DETERMINATION PROCESSING UNIT
44
EVENT INFORMATION TRANSFER UNIT
46
THIRD STORAGE UNIT
48
MODEL INFORMATION
24
PROCESSING SERVER MODEL POSITIONING INFORMATION
50

| EVENT ID | USER ID | WORKDAY/OFF DAY | AM/PM | TERMINAL ID | PLACE | ATTRIBUTE a | ATTRIBUTE b | ATTRIBUTE c | ATTRIBUTE d |
|---|---|---|---|---|---|---|---|---|---|
| 1020 | 1 | WORKDAY | AM | 1 | OFFICE | 20 | 10 | 15 | 12 |

CONDITION 1
CONDITION 2
CONDITION 3
CONDITION 4
CONDITION 5
CONDITION 6
CONDITION 7
CONDITION 8
CONDITION 9
CONDITION 10
CONDITION 11
CONDITION 12
CONDITION 13
NORMAL
ABNORMAL
...

| NODE ID | DETERMINATION ATTRIBUTE NAME | CONDITION | NODE ID OF SLAVE NODE IN CASE WHERE CONDITION IS SATISFIED | NODE ID OF SLAVE NODE IN CASE WHERE CONDITION IS NOT SATISFIED | COMMON-PORTION RETENTION MODEL ID BOUNDARY LIST |
|---|---|---|---|---|---|
| 1 | a | ≥10 | 2 | 3 | 0 |
| 2 | b | >100 | 4 | 1 (NORMAL) | (2, 15) |
| 3 | b | >70 | 0 (ABNORMAL) | 7 | (1, 6) |
| 4 | c | >10 | 8 | 9 | 0 |
| 7 | d | >40 | 14 | 15 | 0 |
| ... | ... | ... | ... | ... | ... |

| MODEL ID | USER ID | WORKDAY/ OFF DAY | AM/PM | TERMINAL ID | PLACE | MODEL FILE PATH |
|---|---|---|---|---|---|---|
| 1 | 1 | WORKDAY | AM | 1 | OFFICE | /model/model1 |
| 2 | 1 | WORKDAY | AM | 1 | MEETING ROOM | /model/model2 |
| 3 | 1 | WORKDAY | PM | 1 | OFFICE | /model/model3 |
| 4 | 1 | WORKDAY | PM | 1 | MEETING ROOM | /model/model4 |
| 5 | 1 | OFF DAY | AM | 1 | OFFICE | /model/model5 |
| ... | ... | ... | ... | ... | ... | ... |

| MODEL ID | COMMON-PORTION RETENTION MODEL ID LIST | UNIQUE-PORTION POSITIONING SERVER ID | COMMON-PORTION POSITIONING SERVER ID |
|---|---|---|---|
| 1 | (1, 2, 3) | 1 | (1, 2, 3) |
| 2 | (1, 2, 3) | 2 | (1, 2, 3) |
| 3 | (1, 2, 3) | 3 | (1, 2, 3) |
| 4 | (4, 5, 6, 7) | 3 | (1, 3, 4, 5) |
| 5 | (4, 5, 6, 7) | 4 | (1, 3, 4, 5) |
| ... | ... | | ... |

| MODEL ID | UNIQUE-PORTION POSITIONING SERVER ID | COMMON-PORTION POSITIONING SERVER ID |
|---|---|---|
| 1 | 1 | (1, 2, 3) |
| 2 | 2 | (1, 2, 3) |
| 3 | 3 | (1, 2, 3) |
| 4 | 3 | (1, 3, 4, 5) |
| 5 | 4 | (1, 3, 4, 5) |
| ... | | ... |

| MODEL ID | UNIQUE-PORTION POSITIONING SERVER ID | COMMON-PORTION MODEL ID |
|---|---|---|
| 1 | 1 | 2 |
| 2 | 2 | 2 |
| 3 | 3 | 2 |
| ... | | ... |

| EVENT ID | USER ID | WORKDAY/ OFF DAY | AM/PM | TERMINAL ID | PLACE | MODEL ID | UNIQUE-PORTION POSITIONING NODE ID | DETERMINATION NODE ID | ATTRIBUTE a | ATTRIBUTE b | ATTRIBUTE c | ATTRIBUTE d |
|---|---|---|---|---|---|---|---|---|---|---|---|---|
| 1020 | 1 | WORKDAY | AM | 1 | OFFICE | 1 | 1 | 1 | 20 | 10 | 15 | 12 |

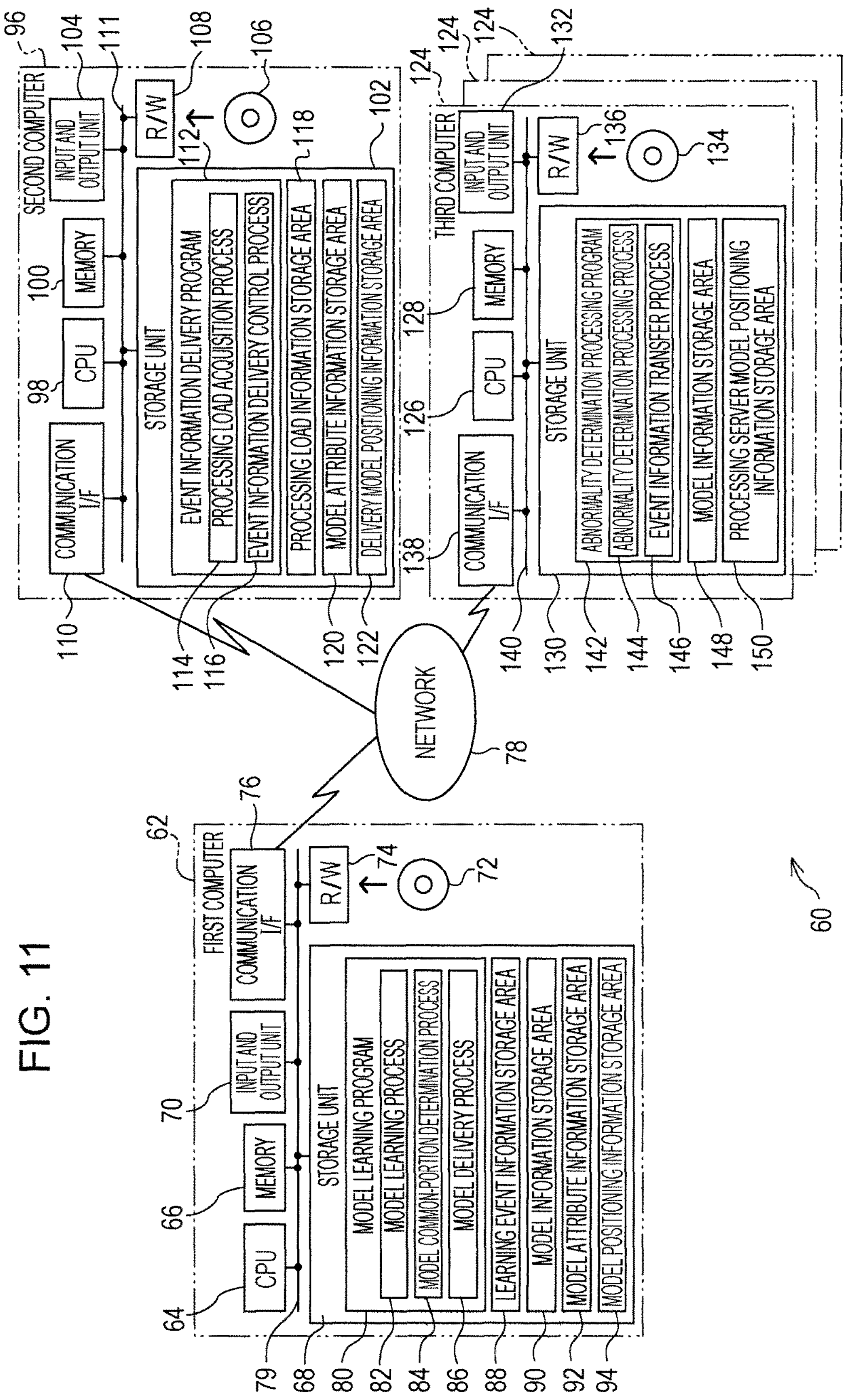
FIG. 11
FIRST COMPUTER
CPU
MEMORY
INPUT AND OUTPUT UNIT
COMMUNICATION I/F
R/W
STORAGE UNIT
MODEL LEARNING PROGRAM
MODEL LEARNING PROCESS
MODEL COMMON-PORTION DETERMINATION PROCESS
MODEL DELIVERY PROCESS
LEARNING EVENT INFORMATION STORAGE AREA
MODEL INFORMATION STORAGE AREA
MODEL ATTRIBUTE INFORMATION STORAGE AREA
MODEL POSITIONING INFORMATION STORAGE AREA
NETWORK
SECOND COMPUTER
COMMUNICATION I/F
CPU
MEMORY
INPUT AND OUTPUT UNIT
R/W
STORAGE UNIT
EVENT INFORMATION DELIVERY PROGRAM
PROCESSING LOAD ACQUISITION PROCESS
EVENT INFORMATION DELIVERY CONTROL PROCESS
PROCESSING LOAD INFORMATION STORAGE AREA
MODEL ATTRIBUTE INFORMATION STORAGE AREA
DELIVERY MODEL POSITIONING INFORMATION STORAGE AREA
THIRD COMPUTER
COMMUNICATION I/F
CPU
MEMORY
INPUT AND OUTPUT UNIT
R/W
STORAGE UNIT
ABNORMALITY DETERMINATION PROCESSING PROGRAM
ABNORMALITY DETERMINATION PROCESSING PROCESS
EVENT INFORMATION TRANSFER PROCESS
MODEL INFORMATION STORAGE AREA
PROCESSING SERVER MODEL POSITIONING INFORMATION STORAGE AREA
60
62
64
66
68
70
72
74
76
78
79
80
82
84
86
88
90
92
94
96
98
100
102
104
106
108
110
111
112
114
116
118
120
122
124
126
128
130
132
134
136
138
140
142
144
146
148
150

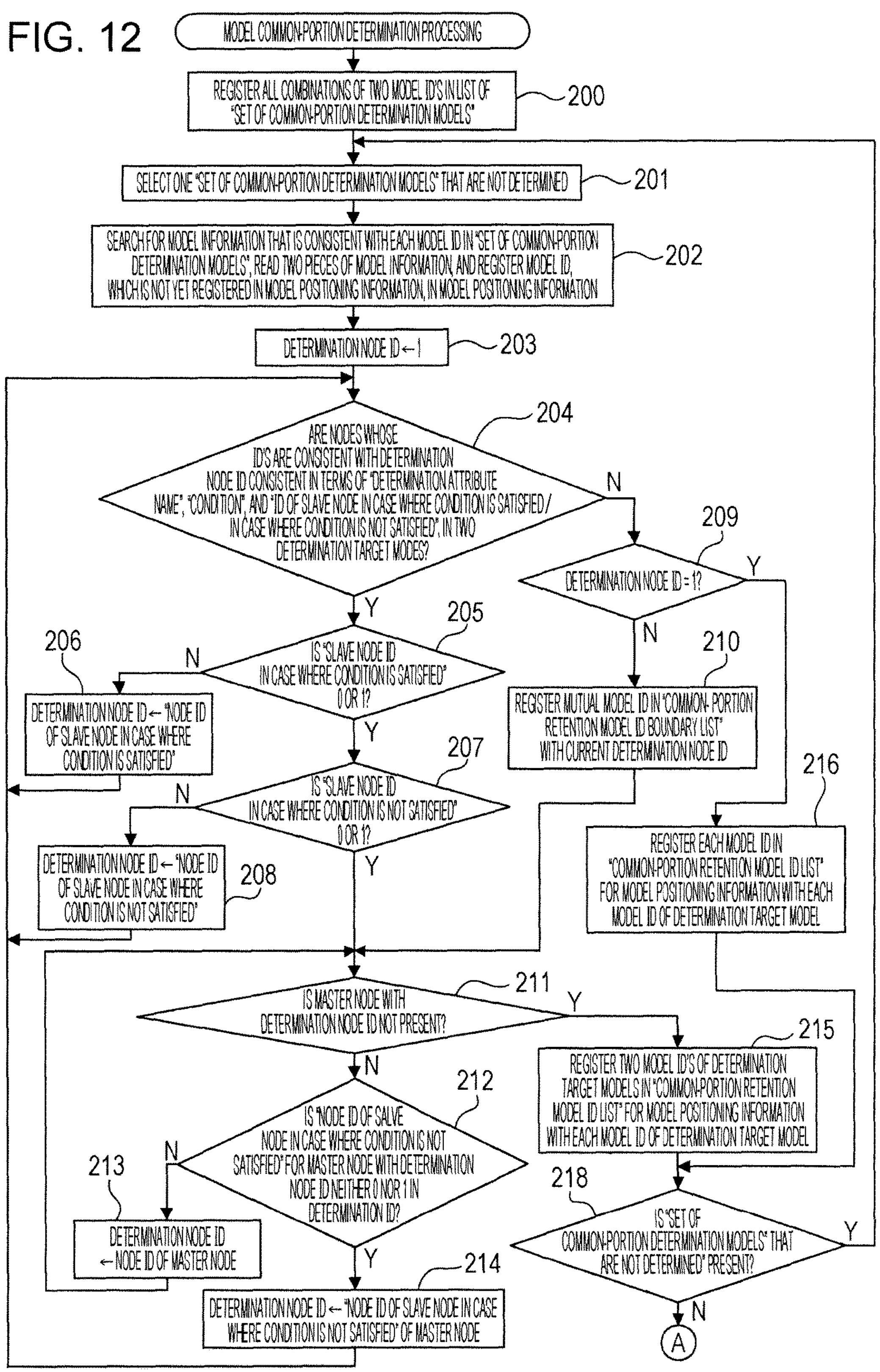
FIG. 12
MODEL COMMON-PORTION DETERMINATION PROCESSING
REGISTER ALL COMBINATIONS OF TWO MODEL ID'S IN LIST OF "SET OF COMMON-PORTION DETERMINATION MODELS"
200
SELECT ONE "SET OF COMMON-PORTION DETERMINATION MODELS" THAT ARE NOT DETERMINED
201
SEARCH FOR MODEL INFORMATION THAT IS CONSISTENT WITH EACH MODEL ID IN "SET OF COMMON-PORTION DETERMINATION MODELS", READ TWO PIECES OF MODEL INFORMATION, AND REGISTER MODEL ID, WHICH IS NOT YET REGISTERED IN MODEL POSITIONING INFORMATION, IN MODEL POSITIONING INFORMATION
202
DETERMINATION NODE ID ← 1
203
ARE NODES WHOSE ID'S ARE CONSISTENT WITH DETERMINATION NODE ID CONSISTENT IN TERMS OF "DETERMINATION ATTRIBUTE NAME", "CONDITION", AND "ID OF SLAVE NODE IN CASE WHERE CONDITION IS SATISFIED / IN CASE WHERE CONDITION IS NOT SATISFIED", IN TWO DETERMINATION TARGET MODES?
204
N
Y
IS "SLAVE NODE ID IN CASE WHERE CONDITION IS SATISFIED" 0 OR 1?
205
206
DETERMINATION NODE ID ← "NODE ID OF SLAVE NODE IN CASE WHERE CONDITION IS SATISFIED"
IS "SLAVE NODE ID IN CASE WHERE CONDITION IS NOT SATISFIED" 0 OR 1?
207
DETERMINATION NODE ID ← "NODE ID OF SLAVE NODE IN CASE WHERE CONDITION IS NOT SATISFIED"
208
DETERMINATION NODE ID = 1?
209
210
REGISTER MUTUAL MODEL ID IN "COMMON- PORTION RETENTION MODEL ID BOUNDARY LIST" WITH CURRENT DETERMINATION NODE ID
216
REGISTER EACH MODEL ID IN "COMMON-PORTION RETENTION MODEL ID LIST" FOR MODEL POSITIONING INFORMATION WITH EACH MODEL ID OF DETERMINATION TARGET MODEL
IS MASTER NODE WITH DETERMINATION NODE ID NOT PRESENT?
211
REGISTER TWO MODEL ID'S OF DETERMINATION TARGET MODELS IN "COMMON-PORTION RETENTION MODEL ID LIST" FOR MODEL POSITIONING INFORMATION WITH EACH MODEL ID OF DETERMINATION TARGET MODEL
215
IS "NODE ID OF SALVE NODE IN CASE WHERE CONDITION IS NOT SATISFIED" FOR MASTER NODE WITH DETERMINATION NODE ID NEITHER 0 NOR 1 IN DETERMINATION ID?
212
213
DETERMINATION NODE ID ← NODE ID OF MASTER NODE
DETERMINATION NODE ID ← "NODE ID OF SLAVE NODE IN CASE WHERE CONDITION IS NOT SATISFIED" OF MASTER NODE
214
IS "SET OF COMMON-PORTION DETERMINATION MODELS" THAT ARE NOT DETERMINED" PRESENT?
218
A

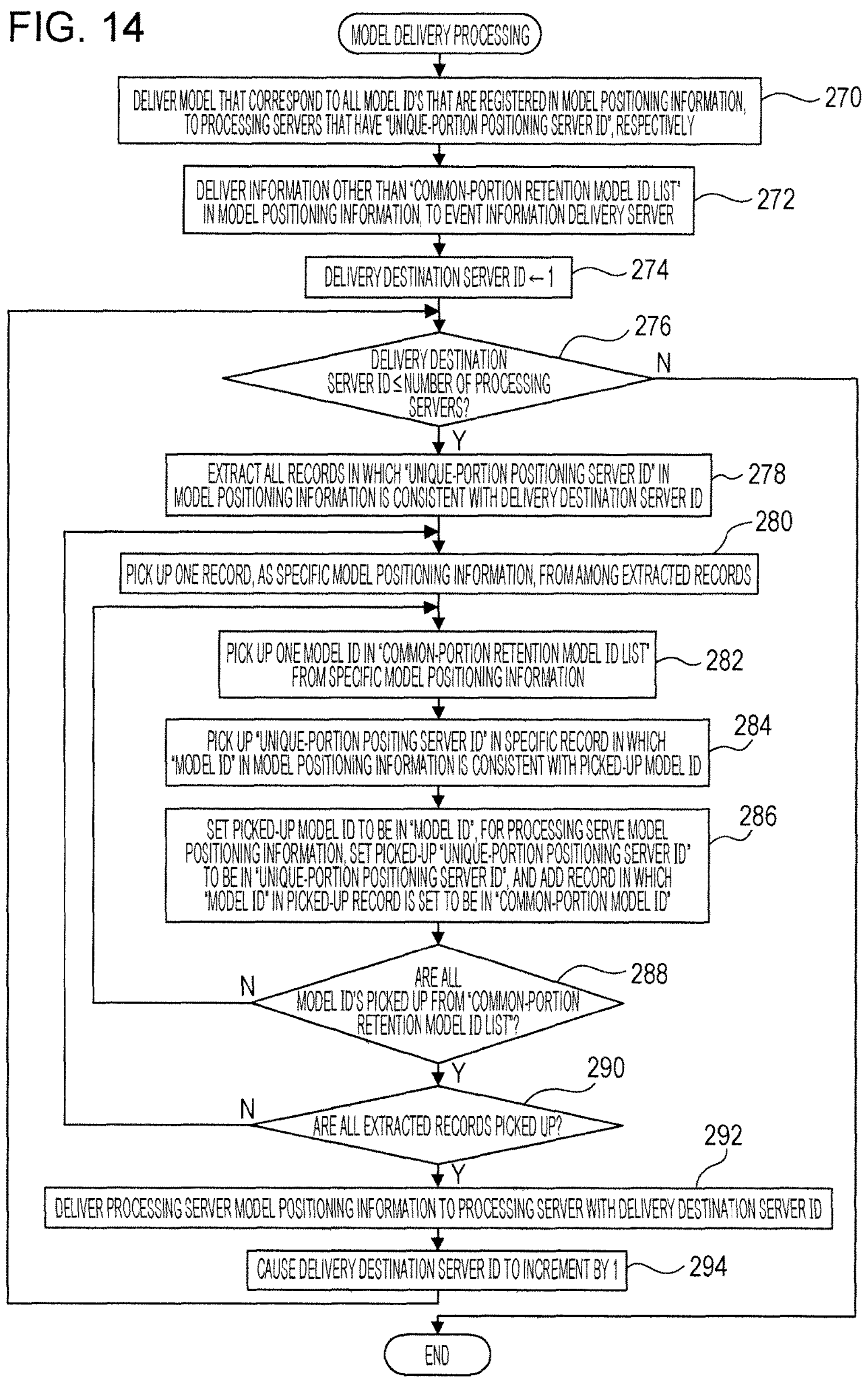
FIG. 14
MODEL DELIVERY PROCESSING
DELIVER MODEL THAT CORRESPOND TO ALL MODEL ID'S THAT ARE REGISTERED IN MODEL POSITIONING INFORMATION, TO PROCESSING SERVERS THAT HAVE "UNIQUE-PORTION POSITIONING SERVER ID", RESPECTIVELY
270
DELIVER INFORMATION OTHER THAN "COMMON-PORTION RETENTION MODEL ID LIST" IN MODEL POSITIONING INFORMATION, TO EVENT INFORMATION DELIVERY SERVER
272
DELIVERY DESTINATION SERVER ID ← 1
274
DELIVERY DESTINATION SERVER ID ≤ NUMBER OF PROCESSING SERVERS?
276
N
Y
EXTRACT ALL RECORDS IN WHICH "UNIQUE-PORTION POSITIONING SERVER ID" IN MODEL POSITIONING INFORMATION IS CONSISTENT WITH DELIVERY DESTINATION SERVER ID
278
PICK UP ONE RECORD, AS SPECIFIC MODEL POSITIONING INFORMATION, FROM AMONG EXTRACTED RECORDS
280
PICK UP ONE MODEL ID IN "COMMON-PORTION RETENTION MODEL ID LIST" FROM SPECIFIC MODEL POSITIONING INFORMATION
282
PICK UP "UNIQUE-PORTION POSITING SERVER ID" IN SPECIFIC RECORD IN WHICH "MODEL ID" IN MODEL POSITIONING INFORMATION IS CONSISTENT WITH PICKED-UP MODEL ID
284
SET PICKED-UP MODEL ID TO BE IN "MODEL ID", FOR PROCESSING SERVE MODEL POSITIONING INFORMATION, SET PICKED-UP "UNIQUE-PORTION POSITIONING SERVER ID" TO BE IN "UNIQUE-PORTION POSITIONING SERVER ID", AND ADD RECORD IN WHICH "MODEL ID" IN PICKED-UP RECORD IS SET TO BE IN "COMMON-PORTION MODEL ID"
286
ARE ALL MODEL ID'S PICKED UP FROM "COMMON-PORTION RETENTION MODEL ID LIST"?
288
N
Y
ARE ALL EXTRACTED RECORDS PICKED UP?
290
N
Y
DELIVER PROCESSING SERVER MODEL POSITIONING INFORMATION TO PROCESSING SERVER WITH DELIVERY DESTINATION SERVER ID
292
CAUSE DELIVERY DESTINATION SERVER ID TO INCREMENT BY 1
294
END

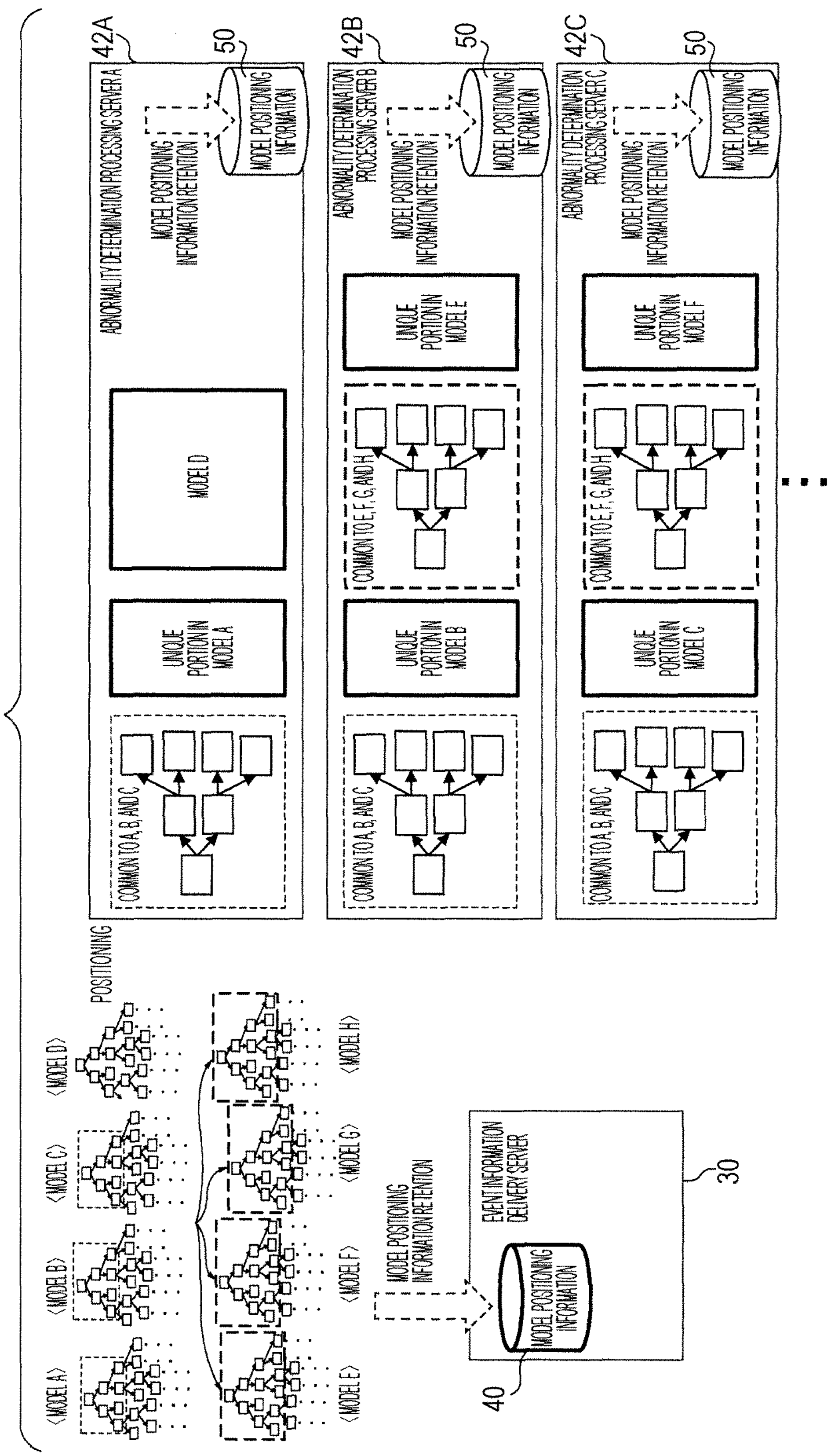

FIG. 18
<MODEL A>
<MODEL B>
<MODEL C>
<MODEL D>
POSITIONING
<MODEL E>
<MODEL F>
<MODEL G>
<MODEL H>
MODEL POSITIONING INFORMATION RETENTION
EVENT INFORMATION DELIVERY SERVER
MODEL POSITIONING INFORMATION
40
30
42A
ABNORMALITY DETERMINATION PROCESSING SERVER A
COMMON TO A, B, AND C
UNIQUE PORTION IN MODEL A
MODEL D
MODEL POSITIONING INFORMATION RETENTION
MODEL POSITIONING INFORMATION
50
42B
ABNORMALITY DETERMINATION PROCESSING SERVER B
COMMON TO A, B, AND C
UNIQUE PORTION IN MODEL B
COMMON TO E, F, G, AND H
UNIQUE PORTION IN MODEL E
MODEL POSITIONING INFORMATION RETENTION
MODEL POSITIONING INFORMATION
50
42C
ABNORMALITY DETERMINATION PROCESSING SERVER C
COMMON TO A, B, AND C
UNIQUE PORTION IN MODEL C
COMMON TO E, F, G, AND H
UNIQUE PORTION IN MODEL F
MODEL POSITIONING INFORMATION RETENTION
MODEL POSITIONING INFORMATION
50

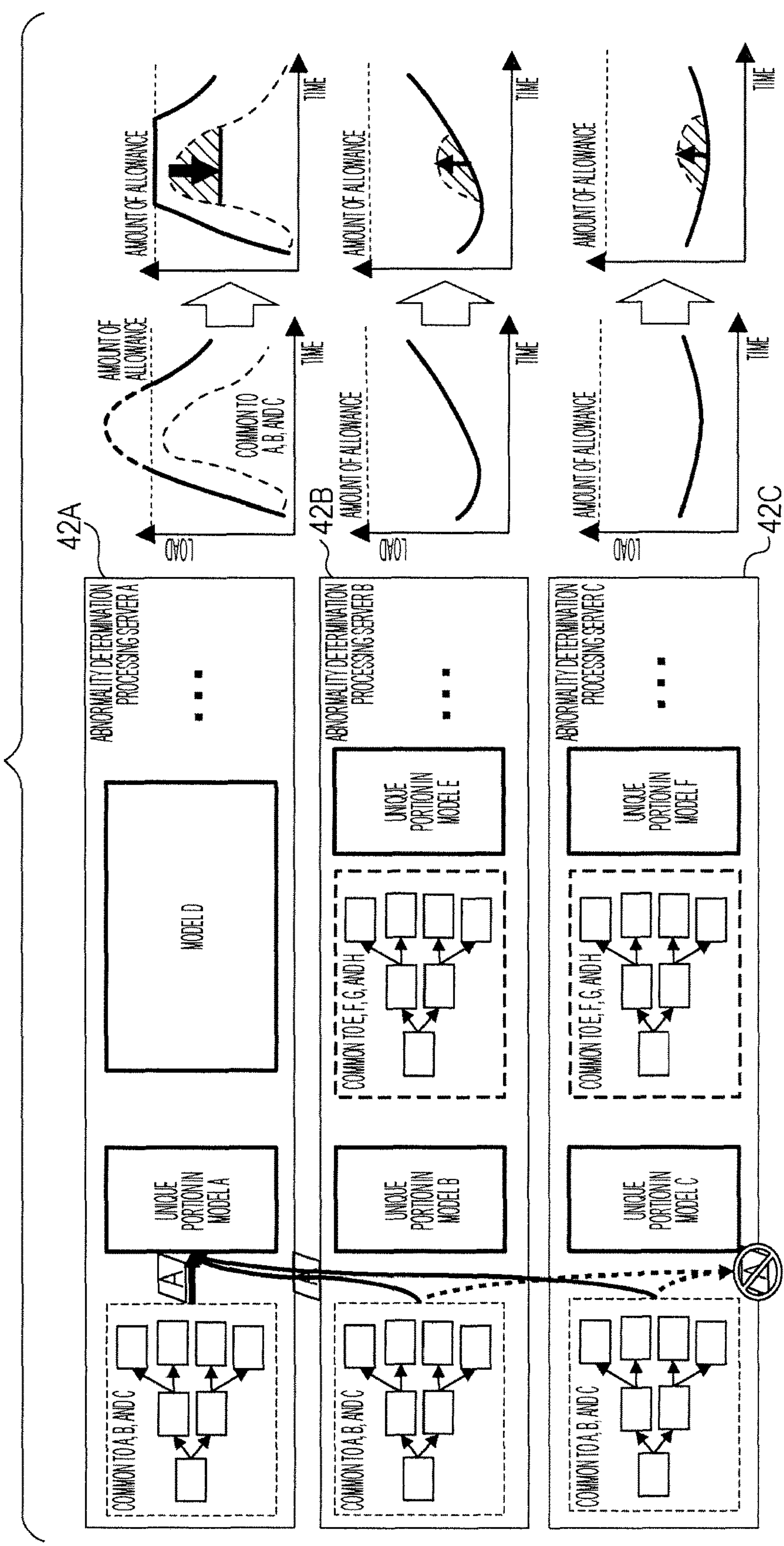
FIG. 21
42A
42B
42C
ABNORMALITY DETERMINATION PROCESSING SERVER A
ABNORMALITY DETERMINATION PROCESSING SERVER B
ABNORMALITY DETERMINATION PROCESSING SERVER C
COMMON TO A, B, AND C
COMMON TO A, B, AND C
COMMON TO A, B, AND C
UNIQUE PORTION IN MODEL A
UNIQUE PORTION IN MODEL B
UNIQUE PORTION IN MODEL C
MODEL D
COMMON TO E, F, G, AND H
COMMON TO E, F, G, AND H
UNIQUE PORTION IN MODEL E
UNIQUE PORTION IN MODEL F
A
LOAD
AMOUNT OF ALLOWANCE
COMMON TO A, B, AND C
TIME
AMOUNT OF ALLOWANCE
TIME

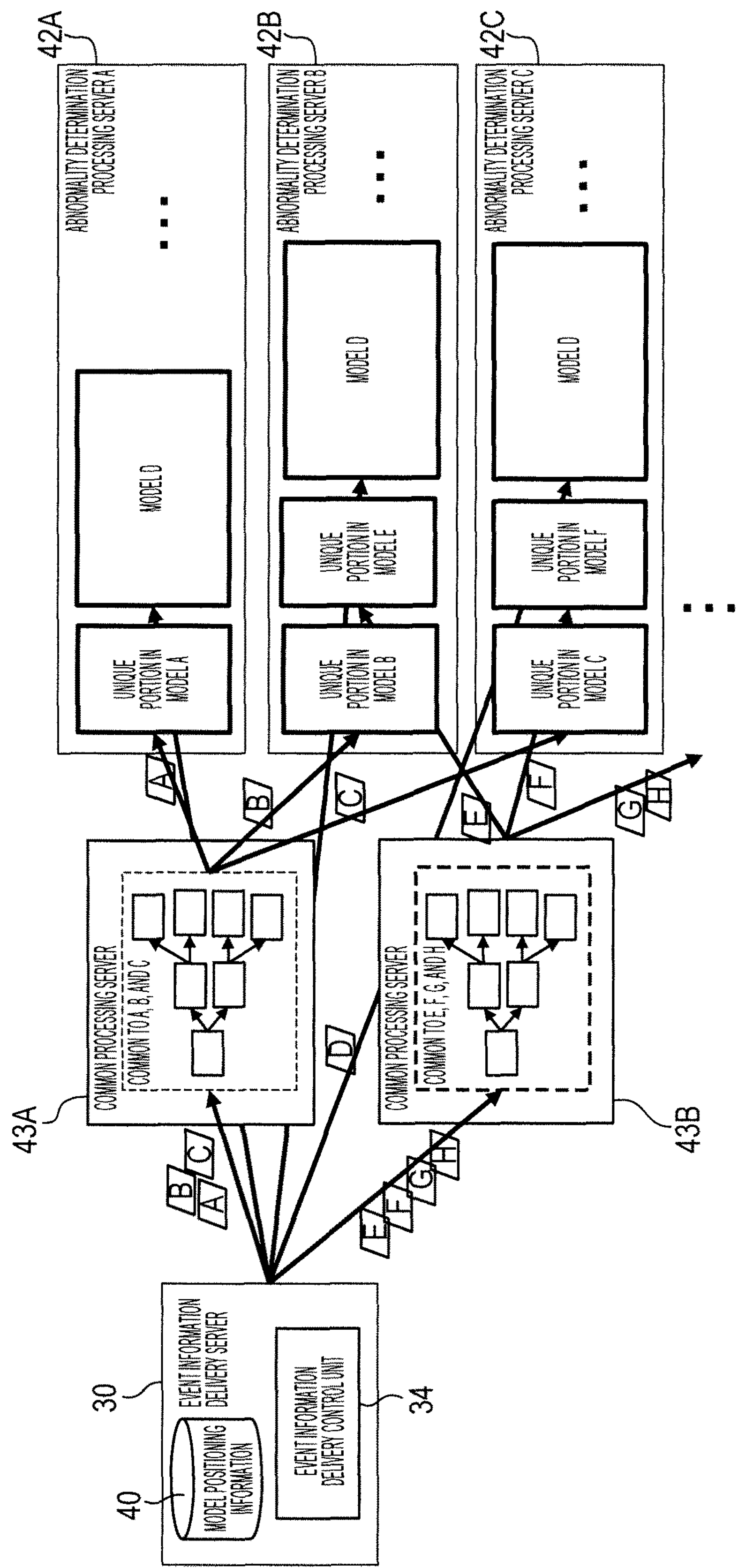
FIG. 22
42A
42B
42C
ABNORMALITY DETERMINATION PROCESSING SERVER A
ABNORMALITY DETERMINATION PROCESSING SERVER B
ABNORMALITY DETERMINATION PROCESSING SERVER C
MODEL D
UNIQUE PORTION IN MODEL A
UNIQUE PORTION IN MODEL B
UNIQUE PORTION IN MODEL E
UNIQUE PORTION IN MODEL C
UNIQUE PORTION IN MODEL F
COMMON PROCESSING SERVER
COMMON TO A, B, AND C
COMMON TO E, F, G, AND H
43A
43B
A
B
C
D
E
F
G
H
30
EVENT INFORMATION DELIVERY SERVER
40
MODEL POSITIONING INFORMATION
EVENT INFORMATION DELIVERY CONTROL UNIT
34

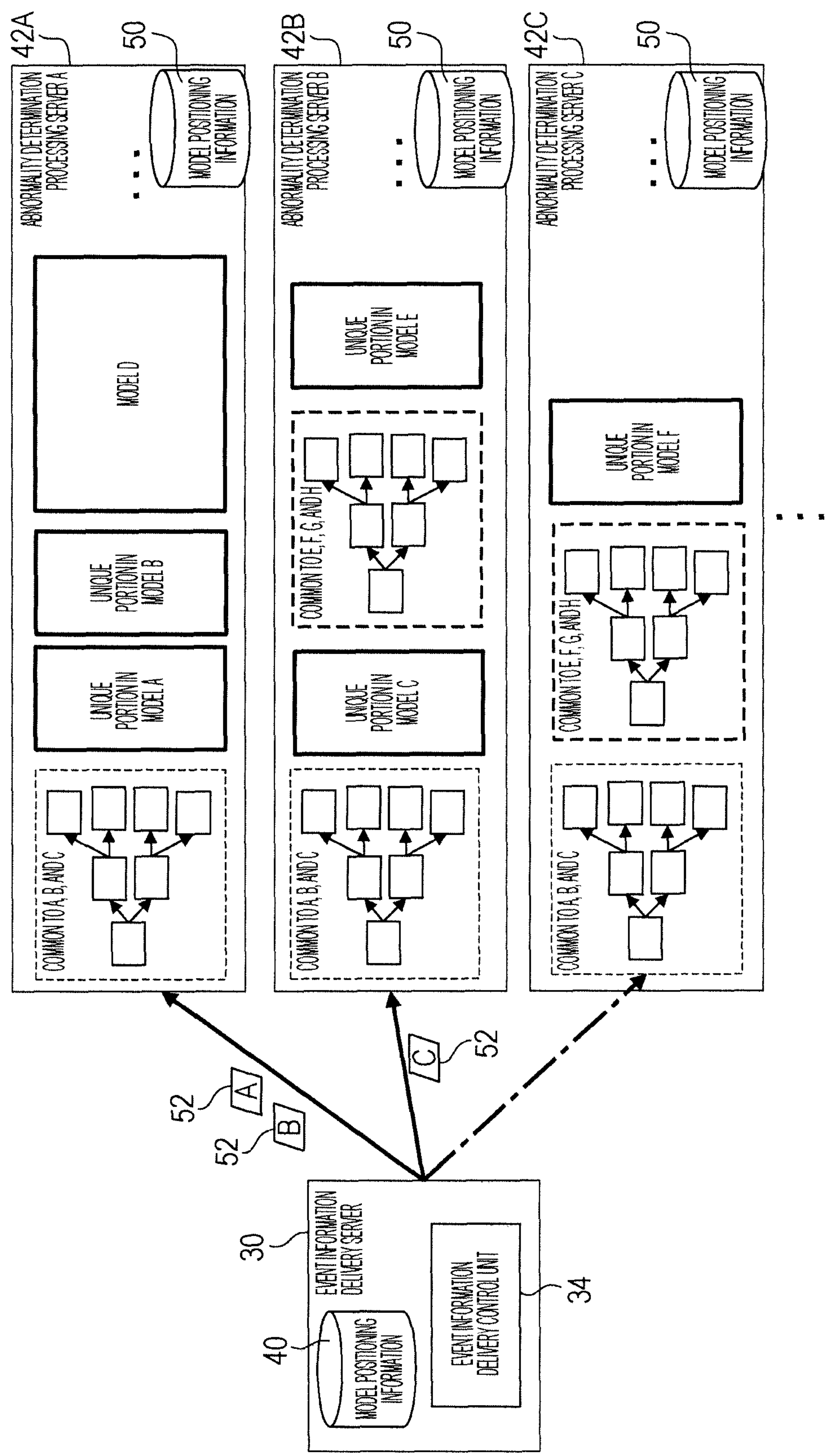
FIG. 24
42A
50
ABNORMALITY DETERMINATION PROCESSING SERVER A
MODEL POSITIONING INFORMATION
MODEL D
UNIQUE PORTION IN MODEL B
UNIQUE PORTION IN MODEL A
COMMON TO A, B, AND C
42B
50
ABNORMALITY DETERMINATION PROCESSING SERVER B
MODEL POSITIONING INFORMATION
UNIQUE PORTION IN MODEL E
COMMON TO E, F, G, AND H
UNIQUE PORTION IN MODEL C
COMMON TO A, B, AND C
42C
50
ABNORMALITY DETERMINATION PROCESSING SERVER C
MODEL POSITIONING INFORMATION
UNIQUE PORTION IN MODEL F
COMMON TO E, F, G, AND H
COMMON TO A, B, AND C
52
A
52
B
C
52
30
EVENT INFORMATION DELIVERY SERVER
40
MODEL POSITIONING INFORMATION
EVENT INFORMATION DELIVERY CONTROL UNIT
34

LOAD DISTRIBUTION SYSTEM, APPARATUS, AND METHOD

CROSS-REFERENCE TO RELATED APPLICATION

This application is based upon and claims the benefit of priority of the prior Japanese Patent Application No. 2016-152123, filed on Aug. 2, 2016, the entire contents of which are incorporated herein by reference.

FIELD

The embodiment discussed herein is related to a load distribution system, a load distribution apparatus, and a load distribution method.

BACKGROUND

A first technology has been proposed in which a load situation of a system that runs on a virtual server is acquired from a plurality of physical servers and a load that is applied to the physical server is allocated according to a genetic algorithm that expresses a load capacity of the system that runs on the virtual server, in a gene arrangement. In the first technology, the allocated load is distributed to a plurality of physical servers.

Furthermore, a second technology also has been proposed in which a service transaction repository that is associated with at least two service transactions which are the same in function is decided and each of the service transactions is associated with at least one data characteristic. In the second technology, a data characteristic pattern in the service transaction repository is decided and a service map that associates the decided data characteristic pattern with a service is decided.

Furthermore, a third technology also has been proposed in which accurate and sufficient maintenance support information for setting up a plan for apparatus maintenance is provided. In the third technology, the number of estimated remaining apparatuses in each elapsed period of time is calculated from an estimated remaining rate and the number of apparatuses installed in the past, an estimated hazard function is calculated from the number of estimated remaining apparatuses and the number of repairs made in the past to calculate an estimated accumulation repair rate, and a prediction accumulation repair rate is calculated by applying a prediction model using data within a learning period of time.

Patent Document 1: Japanese Laid-open Patent Publication No. 2008-269250

Patent Document 2: Japanese Laid-open Patent Publication No. 2006-268848

Patent Document 3: Japanese Laid-open Patent Publication No. 2013-114636

For example, like the third technology, a technology is known in which models for determining occurrence events are generated by learning for every attribute of event information, from a plurality of pieces of event information that represent the occurrence events, respectively, and in which the event is determined by applying a corresponding model from event information after generation of the models. In this technology, in a case where the event information occurs from moment to moment, or in a case where real time is requested for determination of a state of the event, for example, a plurality of processing apparatuses, such as servers, are provided, models different from each other are allocated to the plurality of processing apparatuses, and thus processing is distributed to the plurality of processing apparatuses. It is noted that the processing apparatus includes a CPU (a processor), a memory, a hard disk, a display, a communication interface, and an input device such as a keyboard.

Furthermore, in the field of the technology described above, with application of a machine learning technology, there has been advancement in subdivision of an attribute of the event information that is a unit of model generation, and there is a tendency to determine a state of an occurrence event by selectively applying a model that corresponds to the attribute of the event information, from many more models. As an example of determination of abnormality in user's operation of a terminal, a model for every user who operates the terminal is generated, but for example, models for every user, for every terminal, for every type of days (workday or off day), and for every operating time zone are generated. Thus, an improvement in precision of the abnormality determination is expected. Also in a case where an attribute of the event information is subdivided, because the number of models increases, a configuration is employed in which processing is distributed to a plurality of processing apparatuses.

However, even the processing is distributed by allocating models different from each other to a plurality of processing apparatuses, because which model is to be applied to the determination of the state of the event that is indicated by the occurrence event information is decided according to the attribute of the event information, it is not guaranteed that the frequency of usage of each model is uniform. For this reason, there may be a case where deviation occurs among loads on a plurality of processing apparatuses due to deviation of the frequency of usage of the model and the load on any one of the processing apparatus exceeds an allowable amount.

In theory, it is possible that this problem is solved, if each of the processing apparatuses is made to be able to perform processing using any one of the models, by storing all models in a storage unit mounted in each of the processing apparatuses, which is capable of storing all models. However, it is not realistic to make a built-in memory the storage capacity described above while the number of models tends to increase. Furthermore, it is considered that the allocation of the model to each processing apparatus is adjusted based on the frequency with which each model is used in the past, in such a manner that the load is averaged, but because it is not guaranteed that a future frequency with which each model will be used is the same as in the past, it is difficult to solve the problem described above. Then, it is difficult for the first to third technologies described above to solve the problem of distributing the load to the processing apparatus and suppressing the load from exceeding the amount of allowance without increasing the capacity of each of the processing apparatus to store the model.

SUMMARY

According to an aspect of the invention, a load distribution system includes a first computer configured to: determine, from event information that includes an attribute relating to an occurrence event, a common portion of determination conditions among mutually different models, for a plurality of models that include a plurality of types of determination conditions for determining a state of the event, and store one or more models, which include different models among a plurality of models that include an identical common portion, in each of a plurality of third computers that determines a state of the event of the event information which is a processing target, by applying a model that is stored in a built-in memory; and a second computer configured to: specify from among the plurality of third computers a first third computer that stores, in a built-in memory, a first model of the models that include the identical common portion, which corresponds to the attribute included in the event information which has been input, specify from among the plurality of third computers a second third computer that stores, in a built-in memory, a second model which includes a common portion identical to a common portion included in the first model, decide which one of the first third computer and the second third computer is caused to perform processing of determining the state of the event, according to a load on the first third computer, and cause the decided one of the third computers to perform the processing of determining the state of the event.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a block diagram illustrating a schematic configuration of an abnormality determination system;

FIG. 4 is a table illustrating an example of model information;

FIG. 5 is a table illustrating an example of model attribute information;

FIG. 7 is a table illustrating an example of a model positioning information;

FIG. 8 is a table illustrating an example of a delivery model positioning information;

FIG. 9 is a table illustrating an example of processing server model positioning information;

FIG. 10 is a table illustrating an example of the event information that is delivered from an event information delivery server to an abnormality determination processing server;

FIG. 11 is a block diagram illustrating a schematic configuration of a computer that functions as each server;

FIG. 12 is a flowchart illustrating an example of model common-portion determination processing;

FIG. 14 is a flowchart illustrating an example of model delivery processing;

FIG. 18 is a conceptual diagram illustrating an example of positioning of a model in each abnormality determination processing server with the model delivery processing;

FIG. 21 is a conceptual diagram illustrating an example of a change in a processing load on the abnormality determination processing server, which results from exchanging the abnormality determination processing server to which the event information is delivered from the event information delivery server, according to the processing load;

FIG. 22 is a conceptual diagram illustrating a case where common portions in a plurality of models are positioned in one common processing server;

FIG. 24 is a conceptual diagram illustrating another aspect of the positioning of the model.

DESCRIPTION OF EMBODIMENTS

Figure 2:
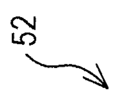
FIG. 2 is a table illustrating an example of event information.

An example of an embodiment of a technology that is disclosed will be described in detail below with reference to the drawings. It is noted that, as an example of determination of a state of an event in the technology that is disclosed, an aspect of determining an abnormality in a user's operation of a terminal, for example, an abnormality in a user's state of health, an identity fraud by another user, or the like from an event information indicating the user's operation of the terminal will be described below. That is, an aspect of generating a model for determining the abnormality in the user's operation of the terminal from the event information, applying the generated model and determining the abnormality in the user's operation of the terminal is described. However, it goes without saying that the technology that is disclosed is not limited to the aspect that will be described and an event of a determination target may be other than the user's operation of the terminal.

FIG. 1 illustrates an abnormality determination system (a load distribution system) 10 according to the present embodiment. The abnormality determination system 10 includes a model learning server 12, an event information delivery server 30, and a plurality of abnormality determination processing server 42. The model learning server 12 includes a model learning unit 14, a model common-portion determination unit 16, a model delivery unit 18, and a first storage unit 20. Learning event information 22 is stored in advance in the first storage unit 20, model information 24 and model attribute information 26 that is generated by the model learning unit 14, and model positioning information 28 that is generated by the model common-portion determination unit 16 is stored in the first storage unit 20.

An example of a plurality of pieces of event information 52 that are stored as pieces of learning event information 22 in the first storage unit 20 is illustrated in FIG. 2. The event information 52 that is illustrated in FIG. 2 is information that is generated each time a terminal that is not illustrated is operated by a user, and includes pieces of information, such as an "event ID" that identifies the event information 52 itself, and a "user ID" that identifies the user that operates the terminal. Furthermore, the event information 52 includes pieces of information, such as "workday/off day" indicating whether the date on which the terminal is operated is a workday or an off day, "AM/PM" indicating whether the part of the day when a terminal is operated is a morning or an afternoon, and a "terminal ID" that identifies the terminal that is operated by a user. Additionally, the event information 52 includes pieces of information, such as a "place" that indicates a place where the user operates the terminal, and "attribute a", 'attribute b", "attribute c", and "attribute d" which are pieces of attribute information of the event information 52 (the user's operation of the terminal device).

It is noted that, as an example of attribute information on the user's operation of the terminal, the number of times that a key of a keyboard is touched down on, a type of key that is touched down on, the number of times that clicking occurs due to a mouse operation, an amount of and the direction of instruction coordinate change, and the like are given, but no limitation to these is imposed. It is noted that, in the event information 52 that is illustrated in FIG. 2, information other than "event ID" is an example of an attribute of "event information".

Figure 3:
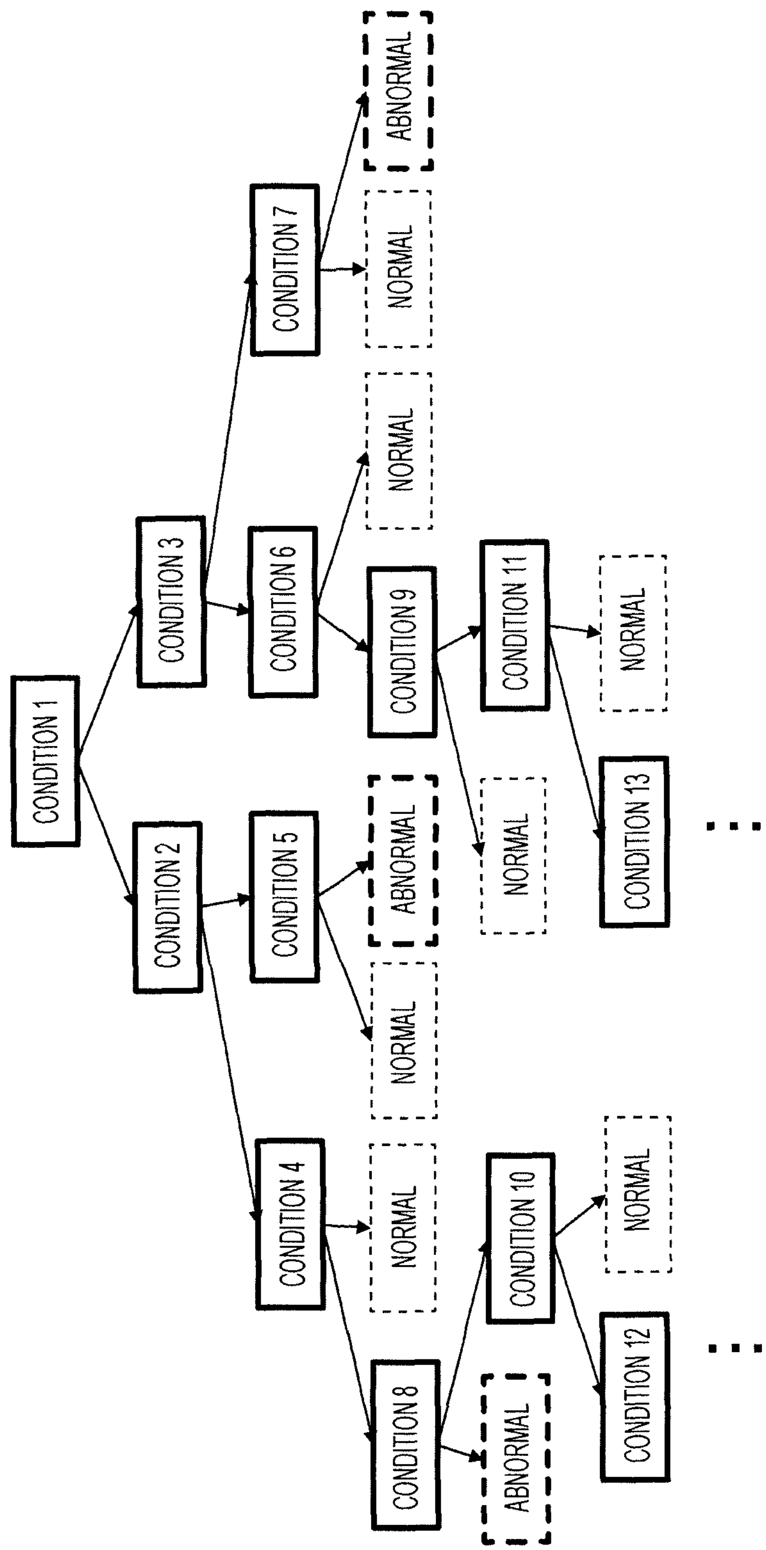
FIG. 3 is a conceptual diagram illustrating an example of a model.

The model learning unit 14 reads the event information 52 from the learning event information 22 one piece of information at a time, and, based on the event information 52 that is read, generates the model information 24 and the model attribute information 26 for determining the abnormality in the user's operation of the terminal, using machine learning. As an example, as illustrated in FIG. 3, the model information 24 that is generated by the model learning unit 14 includes a plurality of types of determination conditions (some of which are conditions 1 to 13 that are illustrated in FIG. 3), and a model for determining whether the user's operation of the terminal is normal or abnormal with the determination conditions being connected to each other in a hierarchical tree. Each of the determination conditions that are included in the model that is indicated by the model information 24 is a determination condition for determining any one attribute information that is included in the event information 52, and, in a case where the condition is satisfied or in a case where the condition is not satisfied, transitions to a different determination condition or an abnormality determination result ("normal" or "abnormal"). According to the present embodiment, each branch determination condition that is included in the model, is referred to as a "node". In the model that is indicated by the model information 24, determinations of node conditions, are sequentially made until the determination result, "normal" or "abnormal" is reached starting from a node at the highest level, and thus it can be determined whether or not the user's operation of the terminal is abnormal.

The model information 24 indicating a model as illustrated in FIG. 3 includes pieces of information, such as "node ID" that identifies each of the nodes and "determination attribute name" indicating an attribute that sets each of the nodes to be a determination target, for every node in the model, as illustrated, as an example, in FIG. 4. Furthermore, for every node, the model information 24 also includes pieces of information, such as "node ID of slave node in a case where condition is satisfied, "node ID of slave node in a case where condition is not satisfied", and "common-portion retention model ID boundary list". It is noted that, in a case where there is a model that has a portion in common with another model, "common-portion retention model ID boundary list", which will be described below, is a list for registering a model ID of the another model that has the common portion, in a node that is equivalent to a boundary of the common portion.

As an example, in FIG. 4, a record that has "node ID"=1 indicates that "node ID of slave node in a case where condition is satisfied"=2 and that "node ID of slave node in a case where condition is not satisfied"=3. This means that in a case where a determination of "node ID"=1 within the model is positive, a determination of "node ID"=2 is made, and that in a case where a determination of "node ID"=1 is negative, a determination of "node ID"=3 is made.

Furthermore, in FIG. 4, a record that has "node ID"=2 indicates that "node ID" of slave node in a case where condition is not satisfied"=1. In the present embodiment, in a case where "node ID of a slave node"=1 is allocated to user's operation of the terminal="normal", and where a determination of "node ID"=2 is negative, it is determined that the user's operation of the terminal is "normal". Furthermore, in FIG. 4, a record that has "node ID"=3 indicates that "node ID of slave node in a case where condition is satisfied"=0. In the present embodiment, in a case where "node ID of a slave node"=0 is allocated to user's operation of the terminal="abnormal", and where a determination of "node ID"=3 is positive, it is determined that the user's operation of the terminal is "abnormal".

It is noted that in the present embodiment, the model learning unit 14 gives a node ID of each node in a model that is generated, according to Rules (1) and (2) that follow. Rule (1): node ID of a slave node=2i in the case where a condition of node ID=i is satisfied Rule (2): node ID of a slave node=2i+1 in the case where a condition of node ID=i is not satisfied A node ID is given according to Rules (1) and (2) described above, and thus the same node ID is given to each node that belongs to a portion that is common to a plurality of models that will be described below. However, Rules (1) and (2) described above are only examples and other rules may be used.

The model attribute information 26 that is generated by the model learning unit 14 is information for extracting a model that, in terms of an attribute information value, is consistent with the event information 52 that is input, from among all models that are indicated by the model information 24, and includes attribute information for every model. For every model, the model attribute information 26, as illustrated in FIG. 5, includes pieces of information, such as "model ID" that identifies each of the models, and "user ID" that identifies the user who operates the terminal. Furthermore, for every model, the model attribute information 26 includes pieces of information, such as "workday/off day" indicating whether the date on which the terminal is operated is a workday or an off day, "AM/PM" indicating whether the part of the day when a terminal is operated is a morning or an afternoon, and a "terminal ID" that identifies the terminal that is operated by a user. Additionally, for every model, the model attribute information 26 includes pieces of information, such as a "place" that indicates a place where the user operates the terminal, and a "model file path" that indicates a path (a directory) in which each of pieces of model information is stored.

It is noted that a well-known technology is available for processing in which the model learning unit 14 generates the model information 24 and the model attribute information 26 from the event information 52 using the machine learning, and therefore, a detailed description thereof is omitted in the present embodiment.

Figure 6:
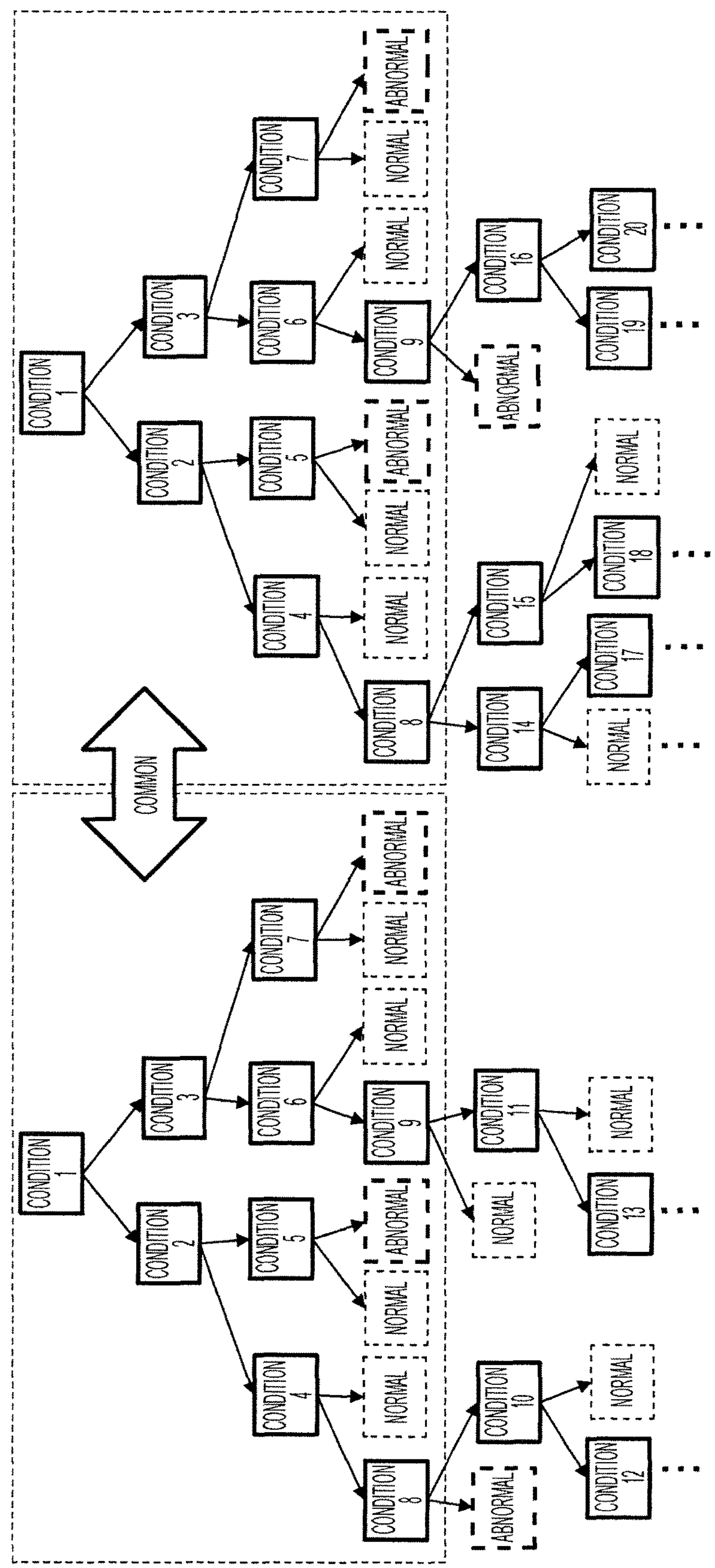
FIG. 6 is a conceptual diagram illustrating an example of a portion that is common to a plurality of models.

The model common-portion determination unit 16 determines a portion of a determination condition (a node) that is included in each model, which is common to a plurality of models that are indicated by a plurality of pieces of model information 24 which are generated by the model learning unit 14. As an example, in models that are illustrated on the left-hand side of FIG. 6 and a model that is illustrated on the right-hand side of FIG. 6, portions that are indicated as being surrounded by a broken line in FIG. 6 are the same, and the model common-portion determination unit 16 determines this portion as a portion that is common to a plurality of models. Furthermore, the model common-portion determination unit 16 decides in which one of a plurality of abnormality determination processing servers 42 each piece of model information is positioned, based on a result of determining the portion that is common to the plurality of models, and generates the model positioning information 28.

As illustrated in FIG. 7, for every model (model information 24) the model positioning information 28 includes various pieces of information, such as "model ID", "common-portion retention model ID list", "unique-portion positioning server ID" and "common-portion positioning server ID".

"Common-portion retention model ID list" is a list for model ID's each of which includes the same common portion, and for example, the first list (1, 2, 3) in FIG. 7 indicates that each of the models (the model information 24) that have ID=1, 2, 3 includes the same common portion. It is noted that in a model (the model information 24) that does not include a common portion, information is not set to be in "common-portion retention model ID list".

An ID of the abnormality determination processing server 42 that arranges non-common portions (which are referred to as "unique portions" in the present embodiment) other than the portion that is common to models (the model information 24) is set to be in "unique-portion positioning server ID". For example, in FIG. 7, "unique-portion positioning server ID"=3 in the fourth record means that a unique portion in a model (the model information 24) that has "model ID"=4 is positioned in the abnormality determination processing server 42 that has ID=3.

The ID of the abnormality determination processing server 42 in which a common portion in a model (the model information 24) is positioned is set to be in "common-portion positioning server ID". For example, "common-portion positioning server ID"=(1, 3, 4, 5) in the fifth record in FIG. 7 means that a common portion in a model (the model information 24) that has "model ID"=5 is positioned in each of the abnormality determination processing servers 42 that have ID=1, 3, 4, 5. It is noted that in a model (the model information 24) that does not include a common portion, information is not set to be in "common-portion positioning server ID".

Based on the model positioning information 28 that is stored in the first storage unit 20 which is generated by the model common-portion determination unit 16, the model delivery unit 18 delivers each piece of model information 24 to each of the abnormality determination processing servers 42. Furthermore, the model delivery unit 18 delivers the model attribute information 26, and information (delivery model positioning information 40 that will be described below) that results from excluding "common-portion retention model ID list" from the model positioning information 28, to the event information delivery server 30. Furthermore, the model delivery unit 18 edits the model positioning information 28 according to each of the abnormality determination processing servers 42, and delivers post-editing model positioning information (processing server model positioning information 50 that will be described below) to each of the corresponding abnormality determination processing servers 42 among the plurality of abnormality determination processing servers 42.

The event information delivery server 30 includes a processing load acquisition unit 32, an event information delivery control unit 34, and a second storage unit 36. Stored in the second storage unit 36 are processing load information 38, and the model attribute information 26 and the delivery model positioning information 40 (refer to FIG. 8) which are delivered from the model delivery unit 18 of the model learning server 12. The processing load acquisition unit 32 periodically acquires information indicating a processing load on each of the abnormality determination processing servers 42 from each of the abnormality determination processing servers 42, and stores the acquired processing load, as the processing load information 38, in the second storage unit 36.

Input into the event information delivery server 30 is the event information 52 (refer to FIG. 2) that is generated each time the terminal operation is performed by the user. Each time the event information 52 is input, the event information delivery control unit 34 checks attribute information of the event information 52 that is input, by comparing the attribute information of the event information 52, which is input, with the model attribute information 26 ("user ID", "workday/off day", "AM/PM", "terminal ID", and "place" in the present embodiment). Then, the event information delivery control unit 34 determines a model (a model that is applied to abnormality determination) that corresponds to the event information 52 that is input, based on a result of the checking, and adds a model ID of the determined model to the event information 52 (also refer to FIG. 10). Furthermore, the event information delivery control unit 34 adds a server ID of the abnormality determination processing server 42 in which a unique portion in the determined model is arranged, as "unique-portion positioning server ID", to the event information 52 (also refer to FIG. 10).

Furthermore, the event information delivery control unit 34 searches for or refers to the delivery model positioning information 40, with the model ID of the determined model as a key, and in a case where the determined model does not include the common portion, delivers the event information 52 to the abnormality determination processing server 42 in which the determined model is positioned. Furthermore, in a case where the determined model includes the common portion, if the processing load on the abnormality determination processing server 42 in which a unique portion in the determined model is positioned is equal to or smaller than an amount of allowance, the event information delivery control unit 34 delivers the event information 52 to the abnormality determination processing server 42 in which the unique portion is positioned. On the other hand, in a case where the processing load on the abnormality determination processing server 42 in which the unique portion is positioned exceeds the amount of allowance, the event information 52 is delivered to the abnormality determination processing server 42 to which the lightest processing load is applied, among the plurality of abnormality determination processing servers 42, in each of which the common portion in the determined model is positioned.

The plurality of abnormality determination processing servers 42 have the same configuration. The abnormality determination processing server 42 includes an abnormality determination processing unit 44, an event information transfer unit 46, and a third storage unit 48. Stored in the third storage unit 48 are the model information 24 and the processing server model positioning information 50 (refer to FIG. 9) that are delivered from the model delivery unit 18 of the model learning server 12. When the event information 52 is delivered from the event information delivery server 30 or another abnormality determination processing server 42, the abnormality determination processing unit 44 determines a model ID of a model that is applied, the model information 24 that has the determined model ID is applied, and thus the abnormality in the user's operation of the terminal is determined.

Furthermore, in a case where the model that is applied includes the common portion, a determination of the abnormality is not completed only with the common portion in the model that is applied, and a unique portion in a model that has "model ID" that is set for the event information 52 is positioned in the abnormality determination processing server 42 itself, the event information transfer unit 46 performs the following processing. That is, the event information transfer unit 46 transfers the event information to the abnormality determination processing server 42 in which the unique portion in the model that has "model ID" which is set for the event information 52 is positioned. It is noted that the abnormality determination processing server 42 is an example of a processing apparatus in the technology that is disclosed.

The model learning server 12, for example, can be implemented as a first computer 62 of a computer system 60 that is illustrated in FIG. 11. The first computer 62 includes a CPU 64, a memory 66, as a temporal storage area, and a nonvolatile storage unit 68. Furthermore, the first computer 62 includes an input and output unit 70 that includes an input and output device, a reader and writer (R/W) 74 that performs reading and writing of data from and to a recording medium 72, and a communication I/F 76 that is connected to a network 78. The CPU 64, the memory 66, the storage unit 68, the input and output unit 70, the R/W 74, and the communication I/F 76 are connected to each other through a bus 79.

The storage unit 68 is a memory, and is implemented as a hard disk drive (HDD), a solid state drive (SSD), a flash memory, or the like. Stored in the storage unit 68 is a model learning program 80 for causing the first computer 62 to function as the model learning server 12. The CPU 64 reads the model learning program 80 from the storage unit 68 for loading onto the memory 66, and sequentially performs processes that are embedded in the model learning program 80.

The model learning program 80 includes a model learning process 82, a model common-portion determination process 84, and a model delivery processing 86. The CPU 64 performs the model learning process 82, and thus operates as the model learning unit 14 that is illustrated in FIG. 1. Furthermore, the CPU 64 performs the model common-portion determination process 84, and thus operates as the model common-portion determination unit 16 that is illustrated in FIG. 1. Furthermore, the CPU 64 performs the model delivery processing 86 and thus operates as the model delivery unit 18 that is illustrated in FIG. 1. Accordingly, the first computer 62 that performs the model learning program 80 functions as the model learning server 12.

Furthermore, the storage unit 68 includes a learning event information storage area 88, a model information storage area 90, a model attribute information storage area 92, and a model positioning information storage area 94. The learning event information 22 is stored in advance in the learning event information storage area 88. Furthermore, the model information 24 is stored in the model information storage area 90, the model attribute information 26 is stored in the model attribute information storage area 92, and the model positioning information 28 is stored in the model positioning information storage area 94. Accordingly, the storage unit 68 functions as the first storage unit 20 that is illustrated in FIG. 1.

The event information delivery server 30, for example, can be implemented as second computer 96 of the computer system 60 that is illustrated in FIG. 11. The second computer 96 includes a CPU 98, a memory 100, and a nonvolatile storage unit 102. Furthermore, the second computer 96 includes an input and output unit 104 that includes an input and output device, an R/W 108 and performs reading and writing data from and to a recording medium 106, and a communication I/F 110 that is connected to the network 78. The CPU 98, the memory 100, the storage unit 102, the input and output unit 104, the R/W 108, and the communication I/F 110 are connected to each other through a bus 111.

The storage unit 102 is implemented as an HDD, an SSD, a flash memory, or the like. Stored in the storage unit 102 is an event information delivery program 112 for causing the second computer 96 to function as the event information delivery server 30. The CPU 98 reads the event information delivery program 112 from the storage unit 102 for loading onto the memory 100, and sequentially processes that are embedded in the event information delivery program 112.

The event information delivery program 112 includes a processing load acquisition process 114 and an event information delivery control process 116. The CPU 98 performs the processing load acquisition process 114 and thus operates as the processing load acquisition unit 32 that is illustrated in FIG. 1. Furthermore, the CPU 98 performs the event information delivery control process 116 and thus operates as the event information delivery control unit 34 that is illustrated in FIG. 1. Accordingly, the second computer 96 that performs the event information delivery program 112 functions as the event information delivery server 30.

Furthermore, the storage unit 102 includes a processing load information storage area 118, a model attribute information storage area 120, and a delivery model positioning information storage area 122. The processing load information 38 is stored in the processing load information storage area 118. Furthermore, the model attribute information 26 is stored in the model attribute information storage area 120, and the delivery model positioning information 40 is stored in the delivery model positioning information storage area 122. Accordingly, the storage unit 102 functions as the second storage unit 36 that is illustrated in FIG. 1.

The abnormality determination processing server 42, for example, can be implemented as each of the plurality of third computers 124 that are provided in the computer system 60 which is illustrated in FIG. 11. The plurality of third computers 124 have the same configuration. The third computer 124 includes a CPU 126, a memory 128, and a nonvolatile storage unit 130. Furthermore, the third computer 124 includes an input and output unit 132 that includes an input and output device, an R/W 136 and performs reading and writing data from and to a recording medium 134, and a communication I/F 138 that is connected to the network 78. The CPU 126, the memory 128, the storage unit 130, the input and output unit 132, the R/W 136, and the communication I/F 138 are connected to each other through a bus 140.

The storage unit 130 is implemented as an HDD, an SSD, a flash memory, or the like. Stored in the storage unit 130 is an abnormality determination processing program 142 for causing the third computer 124 to function as the abnormality determination processing server 42. The CPU 126 reads the abnormality determination processing program 142 from the storage unit 130 for loading onto the memory 128, and sequentially performs processes that are embedded in the abnormality determination processing program 142.

Abnormality determination processing process 144 and event information transfer process 146 are embedded in the abnormality determination processing program 142. The CPU 126 performs the abnormality determination processing process 144 and thus operates as the abnormality determination processing unit 44 that is illustrated in FIG. 1. Furthermore, the CPU 126 performs the event information transfer process 146 and thus operates as the event information transfer unit 46 that is illustrated in FIG. 1. Accordingly, the third computer 124 that performs the abnormality determination processing program 142 functions as the abnormality determination processing server 42.

Furthermore, the model information storage area 90 and a processing server model positioning information storage area 94 are provided in the storage unit 130, the model information 24 is stored in the model information storage area 90, and the processing server model positioning information 50 is stored in the processing server model positioning information storage area 94. Accordingly, the storage unit 130 functions as the third storage unit 48 that is illustrated in FIG. 1.

It is noted that the model learning program 80, the event information delivery program 112, and the abnormality determination processing program 142 are an example of a load distribution control program according to the technology that is disclosed. Furthermore, the model learning server 12, the event information delivery server 30, and the plurality of abnormality determination processing servers 42 are an example of a load distribution control apparatus according to the technology that is disclosed.

Next, operation of the present embodiment is described. When model learning is requested through the input and output unit 70 of the first computer 62, the CPU 64 of the first computer 62 reads the model learning program 80 from the storage unit 68 for execution.

At this point, the model learning process 82 in the model learning program 80 is performed by the CPU 64, and thus the model learning unit 14 performs processing for the model learning. That is, the model learning unit 14 reads the event information 52 from the learning event information 22 one piece of information at a time, and, based on the event information 52 that is read, generates the model information 24 and the model attribute information 26 for determining the abnormality in the user's operation of the terminal, using the machine learning. Then, the model learning unit 14 causes the generated model information 24 and model attribute information 26 to be stored in the first storage unit 20.

Figure 13:
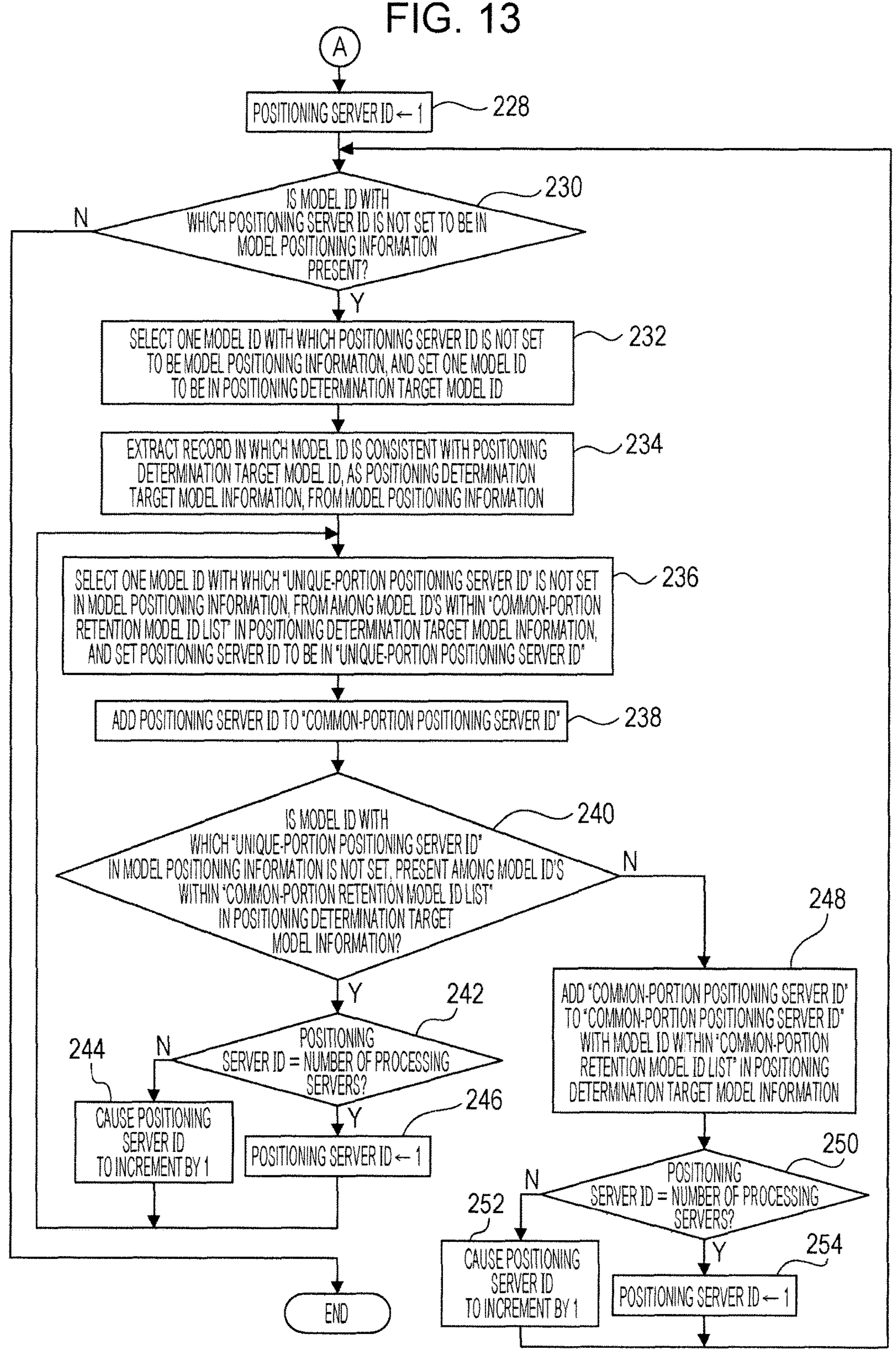
FIG. 13 is a flowchart illustrating an example of the model common-portion determination processing.

When the model information 24 and the model attribute information 26 are stored in the first storage unit 20, the model common-portion determination process 84 in the model learning program 80 is performed by the CPU 64. Accordingly, the model common-portion determination unit 16 performs model common-portion determination processing that is illustrated in FIGS. 12 and 13. The model common-portion determination processing will be described below.

In Step 200 for the model common-portion determination processing, the model common-portion determination unit 16 generates all combinations of sets of model ID's that result when one pair of two pieces of model information 24 is picked up from among all pieces of model information 24 that are stored in the first storage unit 20. Then, the model common-portion determination unit 16 registers all generated combinations of sets of model ID's in the list of "set of common-portion determination models".

In Step 201 that follows, the model common-portion determination unit 16 selects one set of model ID's in which a common portion is not determined, as a set of model ID's that are common-portion determination targets, from the list of "set of common-portion determination models". In Step 202, the model common-portion determination unit 16 searches the pieces of model information 24, which are stored in the first storage unit 20, for the model information 24 to which each of the model ID's that are included in the set of model ID's which are the common-portion determination target is granted. Furthermore, the model common-portion determination unit 16 reads corresponding two pieces of model information 24 from the first storage unit 20. Then, among sets of model ID's that are the common-portion determination target, the model common-portion determination unit 16 registers a model ID that is not registered in the model positioning information 28 (refer to FIG. 7), in the model positioning information 28. In Step 203, the model common-portion determination unit 16 sets 1 to be in "determination node ID", which indicates a node that is a determination target.

In Step 204, in the two pieces of model information 24 that are read in Step 202, the model common-portion determination unit 16 makes a comparison with information on nodes whose node ID is consistent with "determination node ID". Then, it is determined whether or not "determination attribute name", "condition", "ID of slave node in a case where condition is satisfied", and "ID of slave node in a case where condition is not satisfied" (also refer to FIG. 4), which are included in the information on the nodes the comparison with which is made, are all consistent.

In a case where a determination in Step 204 is negative, proceeding to Step 209 takes place. In Step 209, the model common-portion determination unit 16 determines whether or not "determination node ID" is 1. In a case where the determination in Step 204 is negative and where the determination in Step 209 is positive, it can be determined that a set of model ID's that are current common-portion determination targets has different pieces of model information 24, starting with a node that has node ID=1. For this reason, in a case where the determination in Step 209 is positive, proceeding to Step 216 takes place.

In Step 216, in the model positioning information 28, the model common-portion determination unit 16 registers each model ID of a model (a model in question) that corresponds to each record, in "common-portion retention model ID list" in two records that correspond to the model ID's, respectively, which are the common portion determination targets. Then, proceeding to Step 218 takes place.

On the other hand, in a case where the determination in Step 204 is positive, it is determined that in the set of model ID's which are the common-portion determination targets, at least one node is consistent. Because of this, in the case where the determination in Step 204 is positive, proceeding to Step 205 takes place. In Step 205, the model common-portion determination unit 16 determines whether or not "ID of slave node in a case where condition is satisfied" in the model information 24 that is read in Step 202 is "1" which means that terminal operation="normal", or "0" which means that terminal operation="abnormal".

In a case where the determination in Step 205 is negative, proceeding to Step 206 takes place. In Step 206, the model common-portion determination unit 16 sets the node ID, which is set to be in "ID of slave node in a case where condition is satisfied", to be in "determination node ID", in the information on the node, in which a node ID that is included in the model information 24 is consistent with "determination node ID". When processing in Step 206 is performed, returning to Step 204 takes place.

Furthermore, in a case where the determination in Step 205 is positive, proceeding to Step 207 takes place. In Step 207, the model common-portion determination unit 16 determines whether or not "ID of slave node in a case where condition is not satisfied" in the model information 24 that is read in Step 202 is "1" which means that terminal operation="normal", or "0" which means that terminal operation="abnormal".

In a case where the determination in Step 207 is negative, proceeding to Step 208 takes place. In Step 208, the model common-portion determination unit 16 sets the node ID, which is set to be in "ID of slave node in a case where condition is not satisfied", to be in "determination node ID", in the information on the node, in which the node ID that is included in the model information 24 is consistent with "determination node ID". When processing in Step 208 is performed, returning to Step 204 takes place.

Therefore, the model common-portion determination unit 16 reiterates Step 204 to Step 208 as long as the determination in Step 204 is positive. Accordingly, when it comes to the two pieces of model information 24 that are the common-portion determination targets, first, it is checked whether each node is consistent while following a route in a case where each node condition is satisfied.

Furthermore, after the determination in Step 204 is positive one or more times, in a case where the determination in Step 204 is negative, because "determination node ID" is greater than 1, the determination in Step 209 is negative and proceeding to Step 210 takes place. In Step 210, the model common-portion determination unit 16 registers a mutual model ID in "common-portion retention model ID boundary list" in a record that has current "determination node ID", in the two pieces of model information 24 that are the common-portion determination targets, and proceeds to Step 211.

For example, when it is assumed that two model ID's that are the common-portion determination targets are 3 and 7 and that "determination node ID"=5, model ID=7 is registered in "common-portion retention model ID boundary list" in a record that has "determination node ID"=5, in the model information 24 that has model ID=3. Furthermore, model ID=3 is registered in "common-portion retention model ID boundary list" in the record that has "determination node ID"=5, in the model information 24 that has model ID=7. Information that is registered in this example indicates that each node along a route from "determination node ID"=1 to "determination node ID"=5 is consistent, that is, is a common portion, in pieces of model information 24 that have model ID=3, 7.

In Step 211, the model common-portion determination unit 16 determines whether or not a master node in "determination node ID" is present. In a case where the determination in Step 211 is negative, proceeding to Step 212 takes place.

In Step 212, the model common-portion determination unit 16 determines whether or not a node ID that is set to be in "node ID of slave node in a case where condition is not satisfied" for a master node in "determination node ID" is consistent with "determination node ID" and is "0" or "1". When the determination in Step 212 is positive, proceeding to Step 214 takes place. In Step 214, the model common-portion determination unit 16 sets the node ID that is set to be in "node ID of slave node in a case where condition is not satisfied" for the master node in "determination node ID", to be in "determination node ID", and returns to Step 204.

In this case, "determination node ID" is made to turn back to the immediately preceding one from a node at an end of the common portion that is known up to now, and it is checked whether or not the common portion is present on a route that extends from "slave node in a case where condition is not satisfied" that has "determination node ID" which is the immediately preceding one.

Furthermore, when the determination in Step 204 is negative, in a case where "determination node ID" is greater than 1, the determination in Step 209 is negative, and thus the determination in Step 212 is again performed. At this point, in a case where the determination in Step 212 is negative, proceeding to Step 213 takes place. In Step 213, the model common-portion determination unit 16 sets a node ID of a master node that has "determination node ID", to be in "determination node ID" and returns to Step 211. Steps 211, 212, and 213 are reiterated until the determination in Step 211 or Step 212 is positive, and when the determination in Step 212 is positive, "determination node ID" is updated in Step 214. Accordingly, when it is assumed as an example that two models that are the common-portion determination targets are models that are illustrated on the left-hand and right-hand side of the FIG. 6, all ranges that are indicated as being surrounded by a broken line in FIG. 6 are extracted as the common portion.

When determination of common portions of two models that are the common-portion determination targets is completed, the determination in Step 211 is positive, and proceeding to Step 215 takes place. In Step 215, in the model positioning information 28, the model common-portion determination unit 16 registers each of the two model ID's of the determination targets, in "common-portion retention model ID list" in two records that correspond to the model ID's, respectively, which are the common-portion determination targets.

For example, in the example described above, model ID=3, 7 are registered in "common-portion retention model ID list" in a record that has model ID=3 in the model positioning information 28, and model ID=3, 7 are registered in "common-portion retention model ID list" in a record that has model ID=7. Therefore, model ID's of all models that have a portion in common with a model that corresponds to each record are registered to be in common-portion retention model ID list" in each record for the model positioning information 28.

When processing in Step 215, proceeding to Step 218 takes place. In Step 218, the model common-portion determination unit 16 determines whether or not a set of model ID's in which a common portion is not determined is present among sets of model ID's that are registered in the list of "set of common-portion determination models". In a case where the determination in Step 218 is positive, returning to Step 201 takes place, and Step 201 to Step 218 are reiterated until the determination in Step 218 is negative.

Figure 17:
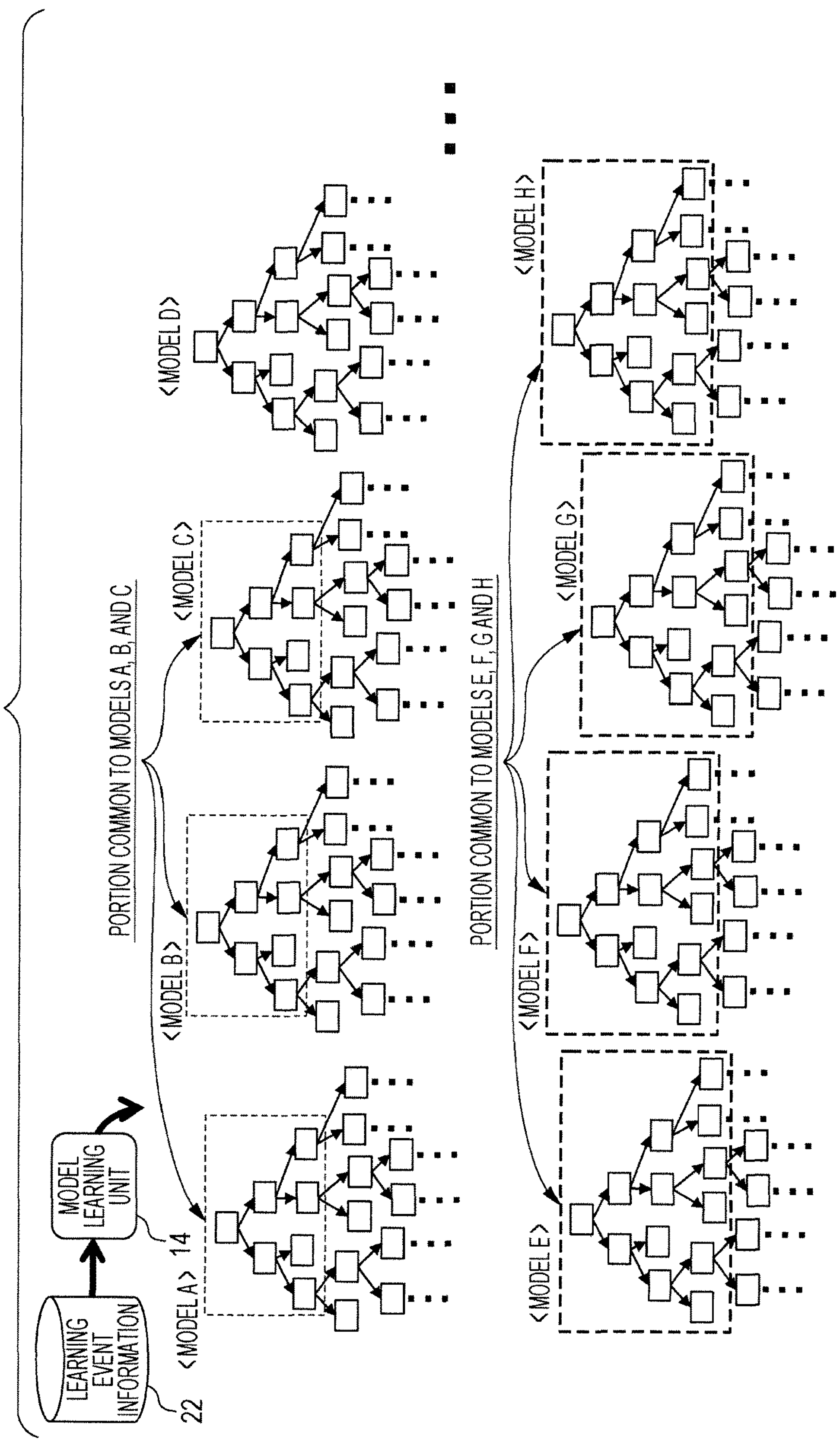
FIG. 17 is a conceptual diagram illustrating an example of a common portion of a model that is determined with the model common-portion determination processing.

Accordingly, common-portion determination is made of each of all sets of model ID's that are registered in the list of "set of common-portion determination models". Then, as a result of the processing described above, as illustrated in an example in FIG. 17, a portion that is common to a plurality of models is determined or extracted. FIG. 17 illustrates an example in which, among 8 models, models A to H, a portion that is common to 3 models, models A to C, is extracted and additionally, a portion that is common to four models, models E to H, is extracted.

When the common portion determination of all sets of model ID's is completed, the determination in Step 218 is negative, proceeding to Step 228 that is illustrated in FIG. 13 takes place. In Step 228, the model common-portion determination unit 16 sets 1 to be in "positioning server ID" indicating the abnormality determination processing server 42 in which the model information 24 is positioned.

In Step 230 that follows, the model common-portion determination unit 16 determines whether or not a model in which "unique-portion positioning server ID" and "common-portion positioning server ID" in the model positioning information 28 are not set is present among models of which model ID's are registered in the model positioning information 28. At a point in time when the determination in Step 230 is performed for the first time, because "unique-portion positioning server ID" and "common-portion positioning server ID" are not set in all models, the determination in Step 230 is positive and proceeding to Step 232 takes place.

In Step 232, the model common-portion determination unit 16 selects one model for which "unique-portion positioning server ID" and "common-portion positioning server ID" in the model positioning information 28 are not set, and sets a model ID of the selected model to be "positioning determination target model ID". In Step 234 that follows, the model common-portion determination unit 16 extracts information in a record in which a model ID is consistent with "positioning determination target model ID" in the model positioning information 28, as positioning determination target model information, from the model positioning information 28.

In Step 236, the model common-portion determination unit 16 selects a model ID for which "unique-portion positioning server ID" in the model positioning information 28 is not set, one at a time, from among model ID's that are set to be in "common-portion retention model ID list" in the positioning determination target model information. Then, the model common-portion determination unit 16 sets "positioning server ID" to be in "unique-portion positioning server ID" in a record in which a model ID in the model positioning information 28 is consistent with the selected model ID. Furthermore, in Step 238, the model common-portion determination unit 16 adds "positioning server ID" to "common-portion positioning server ID" in the record in which the model ID in the model positioning information 28 is consistent with the selected model ID.

In Step 240 that follows, the model common-portion determination unit 16 determines whether or not the model ID for which "unique-portion positioning server ID" in model positioning information 28 is not set is present among the model ID's that are set to be in "common-portion retention model ID list" in the positioning determination target model information. In a case where the determination in Step 240 is positive, proceeding to Step 242 takes place. In Step 242, the model common-portion determination unit 16 determines whether or not "positioning server ID" reaches the number of abnormality determination processing servers 42.

In a case where the determination in Step 242 is negative, proceeding to Step 244 takes place. In Step 244, the model common-portion determination unit 16 causes "positioning server ID" to increment by 1 and returns to Step 236. Furthermore, in a case where the determination in Step 242 is positive, proceeding to Step 246 takes place. In Step 246, the model common-portion determination unit 16 sets 1 to be in "positioning server ID" and returns to Step 236.

Accordingly, Step 236 to Step 246 are reiterated until the determination in Step 240 is negative. Therefore, a model ID is set to be in "common-portion retention model ID list" in the positioning determination target model information, and "unique-portion positioning server ID" and "common-portion positioning server ID" are set for all models for which "unique-portion positioning server ID" in the model positioning information 28 is not set.

Furthermore, because "positioning server ID" is caused to increment by 1, for a model for which whose model ID is set to be in "common-portion retention model ID list" in the positioning determination target model information, that is, a model that has the same common portion, positioning server ID's are different from each other. However, if the number of models that have the same common portion>the number of abnormality determination processing servers 42, there is a likelihood that positioning server ID's of one or several models will overlap, but the positioning server ID's are set as differently from each other as possible.

In a case where the determination in Step 240 is negative, proceeding to Step 248 takes place. In Step 248, the model common-portion determination unit 16 extracts a server ID that is set to be in "common-portion positioning server ID" in the positioning determination target model information. Then, the model common-portion determination unit 16 adds the extracted server ID to "common-portion retention model ID list" in a record in which the model ID is consistent with the model ID that is set to be in "common-portion positioning server ID" in the positioning determination target model information, in model positioning information 28.

In Step 250 that follows, the model common-portion determination unit 16 determines whether or not "positioning server ID" reaches the number of abnormality determination processing servers 42. In a case where the determination in Step 250 is negative, proceeding to Step 252 takes place. In Step 252, the model common-portion determination unit 16 caused "positioning server ID" to increment by 1 and returns to Step 230. Furthermore, in a case where the determination in Step 250 is positive, proceeding to Step 254 takes place. In Step 254, the model common-portion determination unit 16 sets 1 to be in "positioning server ID" and returns to Step 230.

Accordingly, Step 230 to Step 254 are reiterated until the determination in Step 230 is negative, and "unique-portion positioning server ID" and "common-portion positioning server ID" are set for all models whose model ID's are registered in the model positioning information 28. When the determination in Step 230 is negative, the model common-portion determination processing is ended.

When the model common-portion determination unit 16 ends the model common-portion determination processing, the model delivery processing 86 that is embedded in the model learning program 80 is performed by the CPU 64, and thus the model delivery unit 18 performs model delivery processing that is illustrated in FIG. 14.

In Step 270 for the model delivery processing, the model delivery unit 18 delivers all pieces of model information 24, a model ID in which is registered in the model positioning information 28, each of the abnormality determination processing servers 42 that have the server ID's which are set to be in "unique-portion positioning server ID" in the model positioning information 28. Each of the abnormality determination processing server 42 stores the model information 24, which is delivered by the model delivery unit 18 from the model learning server 12, in the third storage unit 48. FIG. 18 illustrates an example in which one or several portions of the model information 24 of the model that is illustrated in FIG. 17, are positioned in three abnormality determination processing servers 42.

In Step 272 that follows, the model delivery unit 18 delivers information other than "common-portion retention model ID list" in the model positioning information 28, and the model attribute information 26 to the event information delivery server 30. The event information delivery server 30 stores the pieces of information described above, which are delivered by the model delivery unit 18 from the model learning server 12, as the delivery model positioning information 40 (also refer to FIG. 8) and the model attribute information 26, in the second storage unit 36.

In Step 274, the model delivery unit 18 sets 1 to be in "delivery destination server ID" indicating the abnormality determination processing server 42 that is a target to which the model positioning information is delivered. In Step 276, the model delivery unit 18 determines whether or not "delivery destination server ID" is equal to or smaller than the number of abnormality determination processing servers 42. In a case where the determination in Step 276 is positive, proceeding to Step 278 takes place. In Step 278, the model delivery unit 18 extracts all records in which "unique-portion positioning server ID" in the model positioning information 28 is consistent with "delivery destination server ID", from the model positioning information 28.

In Step 280 that follows, the model delivery unit 18 picks up one record, as specific model positioning information, from among the records that are extracted from the model positioning information 28 in Step 278. In Step 282, the model delivery unit 18 picks up one model ID from among the model ID's that are set to be in "common-portion retention model ID list" in the specific model positioning information that is picked up in Step 280. In Step 284, the model delivery unit 18 picks up the server ID that is set to be in "unique-portion positioning server ID" in a record in which "model ID" in the model positioning information 28 is consistent with the model ID that is picked up in Step 282.

In Step 286, first, the model delivery unit 18 secures an area in which as much information as is indispensable for one record for the processing server model positioning information 50 is stored, on the memory 128. As illustrated in FIG. 9, the processing server model positioning information 50 includes information headings, such as "model ID", "unique-portion positioning server ID", and "common-portion model ID". The model delivery unit 18 sets the model ID that is picked up in Step 282, to be in "model ID" in the area for one record for the processing server model positioning information 50, which is secured on the memory 128. Furthermore, the model delivery unit 18 sets "unique-portion positioning server ID" that is picked in Step 284, to be in "unique-portion positioning server ID" in the area for one record, and sets "model ID" in the record that is picked up in Step 280, to be in "common-portion model ID".

In Step 288, the model delivery unit 18 determines whether or not all model ID's that are set to be in "common-portion retention model ID list" in the specific model positioning information that is picked up in Step 280 are picked up. In a case where the determination in Step 288 is negative, returning to Step 282 takes place, and Step 282 to Step 288 are reiterated until the determination in Step 288 is positive. Accordingly, a corresponding record for the processing server model positioning information 50 is provided to all models of which model ID's are set to be in "common-portion retention model ID list" in the specific model positioning information, and each piece of information is set.

In a case where the determination in Step 288 is positive, proceeding to Step 290 takes place. In Step 290, the model delivery unit 18 determines whether or not all records that are extracted from the model positioning information 28 in Step 278 are picked up as pieces of specific model positioning information. In a case where the determination in Step 290 is negative, returning to Step 280 takes place, and Step 280 to Step 290 are reiterated until the determination in Step 290 is positive. Therefore, when it comes to each record in which "unique-portion positioning server ID" in the model positioning information 28 is consistent with "delivery destination server ID", a record that corresponds to all models in "common-portion retention model ID list" are provided to the processing server model positioning information 50, and each piece of information is set. Accordingly, the processing server model positioning information 50 that is delivered to the abnormality determination processing server 42 of which server ID is consistent with "delivery server destination server ID" is generated.

When the determination in Step 290 is positive, proceeding to Step 292 takes place. In Step 292, the model delivery unit 18 delivers the processing server model positioning information 50 that is stored in the memory 128, to the abnormality determination processing server 42 whose server ID is consistent with "delivery destination server ID". The abnormality determination processing server 42 whose server ID is consistent with "delivery destination server ID" stores the processing server model positioning information 50, which is delivered by the model delivery unit 18 from the model learning server 12, in the third storage unit 48.

In Step 294 that follows, the model delivery unit 18 causes "delivery destination server ID" to increment by 1, and returns to Step 276. Accordingly, Step 276 to Step 294 are reiterated until the determination in Step 276 is positive, and generation and delivery of the corresponding processing server model positioning information 50 are performed on all abnormality determination processing servers 42. Then, when the determination in Step 276 is negative, the model delivery processing is ended.

Furthermore, when the second computer 96 is powered on, the CPU 98 of the second computer 96 reads the event information delivery program 112 from the storage unit 102 for execution. At this point, the processing load acquisition process 114 that is embedded in the event information delivery program 112 is executed by the CPU 98, and thus the processing load acquisition unit 32 of the event information delivery server 30 performs processing load acquisition processing. That is, the processing load acquisition unit 32 periodically acquires processing load from each of the abnormality determination processing servers 42, and performs processing that updates the processing load information 38 which is stored in the second storage unit 36.

Figure 15:
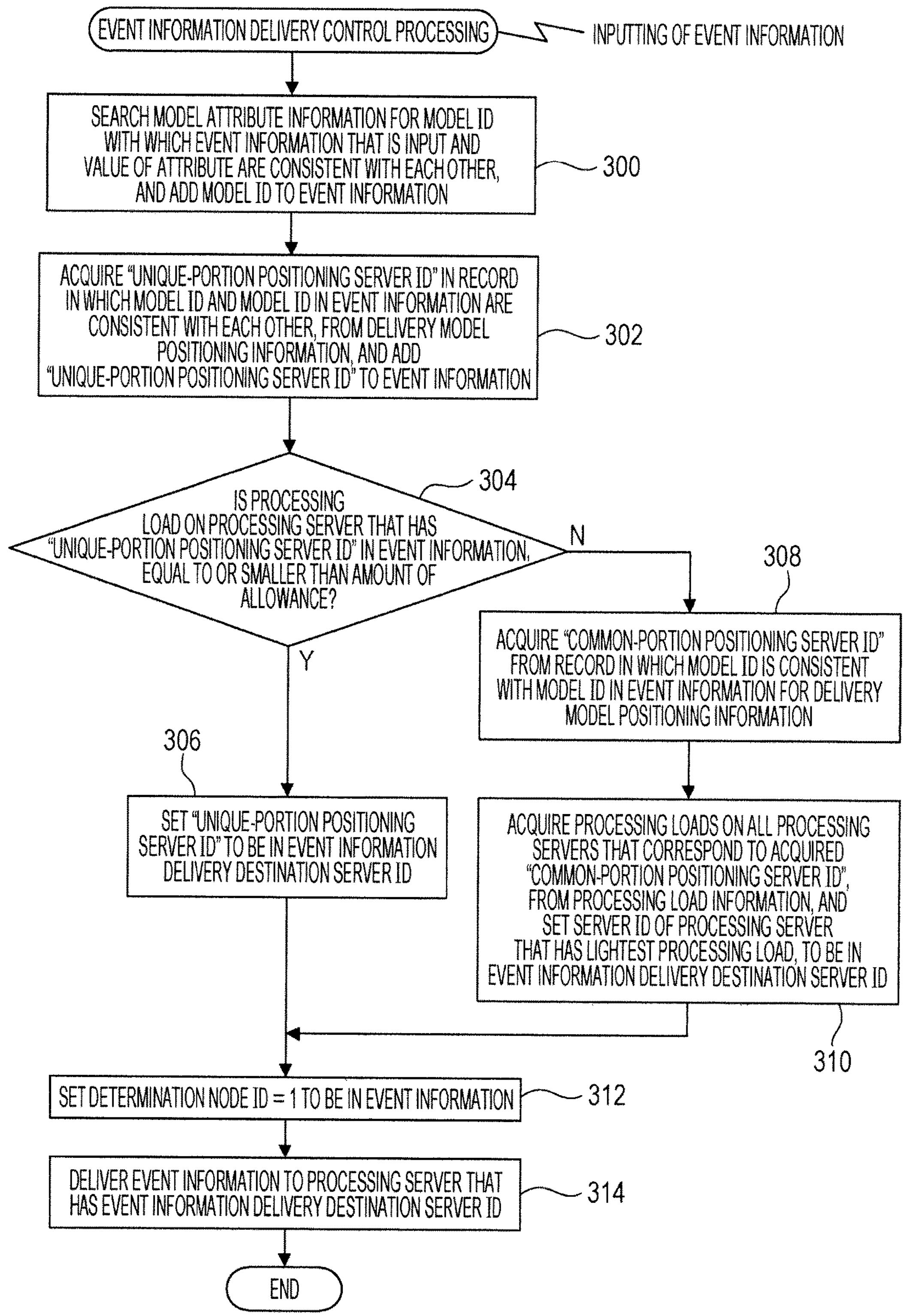
FIG. 15 is a flowchart illustrating an example of event information delivery processing.

Furthermore, when the model common-portion determination processing and the model delivery processing, which are described above, are performed in the model learning server 12, the processing load information 38, the model attribute information 26, and the delivery model positioning information 40 are in a state of being stored in the second storage unit 36 of the event information delivery server 30. In this state, when the event information 52 is input into the event information delivery server 30, the event information delivery control process 116 that is embedded in the event information delivery program 112 is performed by the CPU 98. Accordingly, the event information delivery control unit 34 performs event information delivery control processing that is illustrated in FIG. 15.

Step 300 for the event information delivery control processing, the event information delivery control unit 34 searches the model attribute information 26 for a model ID, according to which the event information 52 that is input and a value of attribute information are consistent with each other. In the present embodiment, pieces of information, such as "user ID", "workday/off day", "AM/PM", "terminal ID", and "place" are included in the attribute information. Then, the event information delivery control unit 34 adds the model ID, which is extracted as a result of searching the model attribute information 26, as "model ID" (refer to FIG. 10) to the event information 52 that is input into the event information delivery server 30.

In Step 302 that follows, the event information delivery control unit 34 acquires, from the delivery model positioning information 40, a server ID that is set in "unique-portion positioning server ID" in a record which is consistent with "model ID" in the event information 52. Then, the event information delivery control unit 34 adds the acquired server ID, as "unique-portion positioning server ID" (refer to FIG. 10), to the event information 52.

In Step 304, the event information delivery control unit 34 acquires the processing load on the abnormality determination processing server 42 whose server ID is consistent with "unique-portion positioning server ID" in the event information 52, from the processing load information 38, and determines whether or not the acquired processing load is equal to or smaller than the amount of allowance. In a case where the determination in Step 304 is positive, the abnormality determination processing server 42 whose server ID is consistent with "unique-portion positioning server ID" in the event information 52 can determine that current event information 52 is able to be processed. For this reason, in a case where the determination in Step 304 is positive, proceeding to Step 306 takes place. In Step 306, the event information delivery control unit 34 sets "unique-portion positioning server ID" in the event information 52 to be in "event information delivery destination server ID" indicating the abnormality determination processing server 42 that is an event information delivery destination, and proceeding to Step 312 takes place.

Furthermore, in a case where the determination in Step 304 is negative, the abnormality determination processing server 42 whose server ID is consistent with "unique-portion positioning server ID" in the event information 52 can determine that the processing of current event information 52 is not suitable. For this reason, in a case where the determination in Step 304 is negative, proceeding to Step 308 takes place. In Step 308, the event information delivery control unit 34 acquires the server ID that is set to be in "common-portion positioning server ID", from the record which "model ID" in the delivery model positioning information 40 is consistent with "model ID" in the event information 52. It is noted that, in a case where "model ID" corresponds to the model information 24 that includes a common portion, a plurality of server ID's are acquired with the processing described above.

In Step 310 that follows, the event information delivery control unit 34 acquires processing loads on all abnormality determination processing servers 42 whose server ID's are acquired in Step 308, from the processing load information 38. Then, the event information delivery control unit 34 sets the server ID of the abnormality determination processing server 42, the acquired processing load on which is the lightest, to be in "event information delivery destination server ID" and proceeding to Step 312 takes place.

In Step 312, the event information delivery control unit 34 sets "1", as "determination node ID" (refer to FIG. 10), for the event information 52. In Step 314, the event information delivery control unit 34 delivers the event information 52 to the abnormality determination processing server 42 that has the event information delivery destination server ID, and ends the event information delivery control processing.

Figure 19:
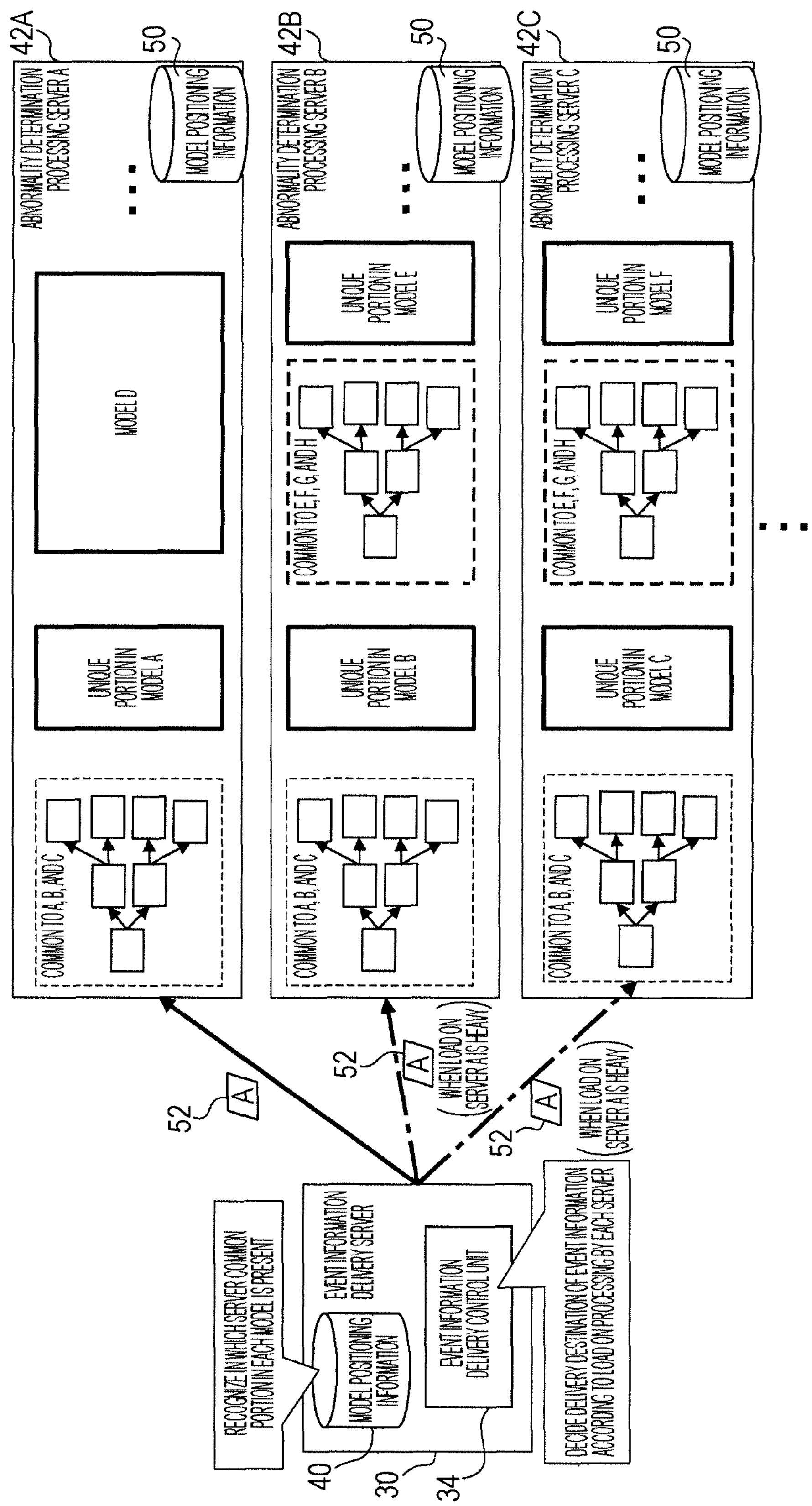
FIG. 19 is a conceptual diagram illustrating an example of delivery of the event information to the abnormality determination processing server with the event information delivery processing.

FIG. 19 illustrates an example in which the event information delivery control processing described above is performed and thus the event information 52 is delivered from the event information delivery server 30 to the abnormality determination processing server 42.

In the example in FIG. 19, pieces of model information 24 on models A and D are positioned in an abnormality determination processing server 42A, pieces of model information 24 on models B and E are positioned in an abnormality determination processing server 42B, and pieces of model information 24 on models C and F are positioned in an abnormality determination processing server 42C. It is noted that in FIG. 19, the models A to C have common portions. Furthermore, an expression of the event information 52 as "A", which is delivered from the event information delivery server 30 to the abnormality determination processing server 42, means that a model ID of the model A is set to be in "model ID" in the event information 52.

In FIG. 19, an arrow facing in the direction from the event information delivery server 30 to the abnormality determination processing server 42A is indicated by a solid line. As is expressed by this solid line arrow, in a case where a processing load on the abnormality determination processing server 42A is equal to or smaller than the amount of allowance, the event information 52 in which the model ID of the model A is set to be in "model ID" is delivered to the abnormality determination processing server 42A in which the model A is positioned.

On the other hand, in FIG. 19, an arrow facing in the direction from the event information delivery server 30 to the abnormality determination processing server 42B and the abnormality determination processing server 42C is indicated by a dashed-dotted line. As expressed by this dashed-dotted line arrow, in a case where the processing load on the abnormality determination processing server 42A exceeds the amount of allowance, the event information 52 in which the model ID of the model A is set to be in "model ID" is delivered to the abnormality determination processing server 42B in which the model B that has a portion in common with the model A is positioned. Alternatively, the event information 52 is delivered to the abnormality determination processing server 42C in which the model C that has a portion in common with the model A is positioned. Accordingly, the processing load on the abnormality determination processing server 42A is suppressed from exceeding the amount of allowance, and the processing load on the abnormality determination processing server 42A is distributed to the abnormality determination processing server 42B or the abnormality determination processing server 42C.

Figure 16:
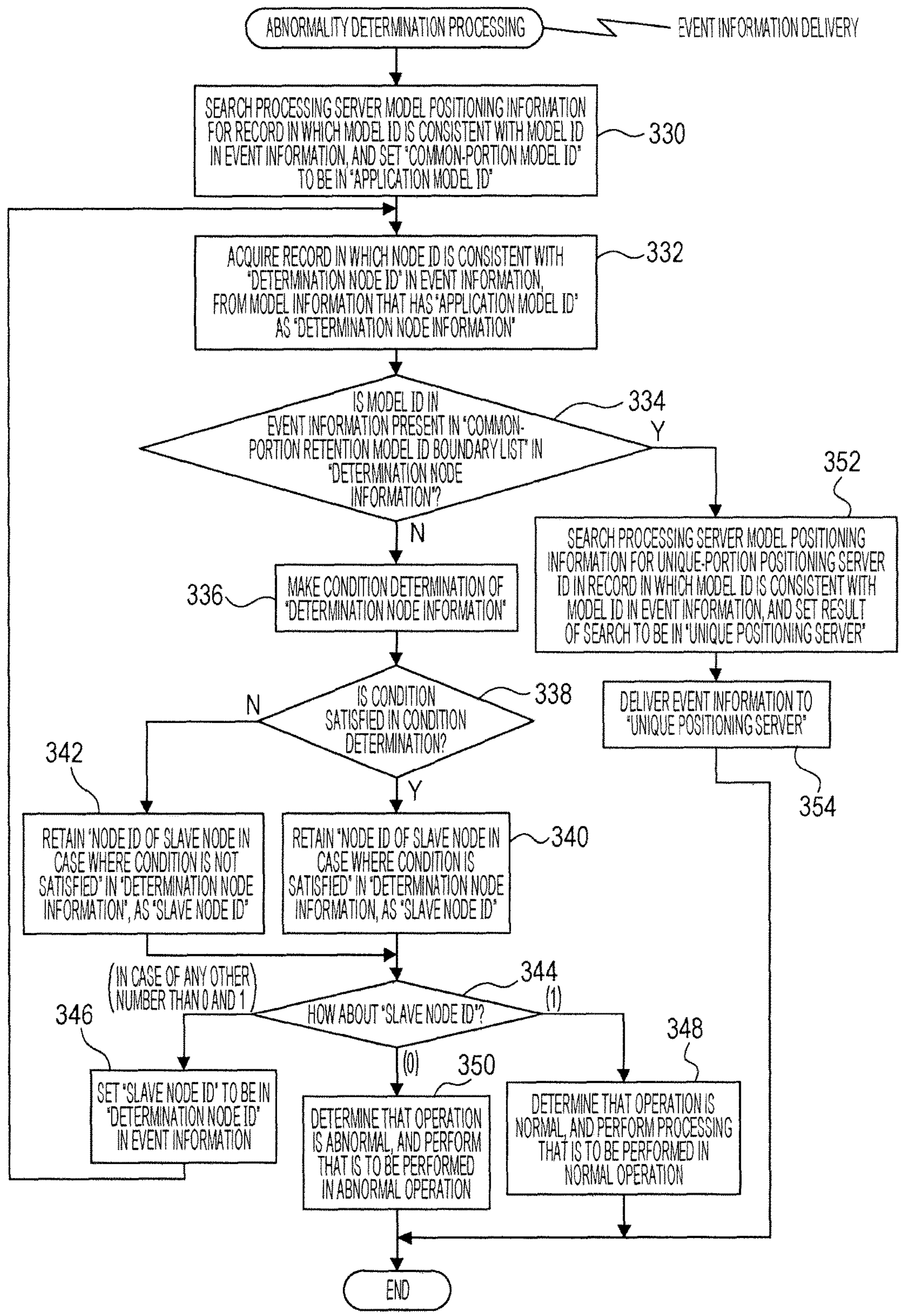
FIG. 16 is a flowchart illustrating an example of abnormality determination processing.

On the other hand, when the model common-portion determination processing and the model delivery processing, which are described above, are performed in the model learning server 12, the model information 24 and the processing server model positioning information 50 are in a state of being stored in the third storage unit 48 of the abnormality determination processing server 42. In this state, when the event information 52 is delivered from the event information delivery server 30 or another abnormality determination processing server 42 to the abnormality determination processing server 42, the abnormality determination processing program 142 is executed by the CPU 126. Accordingly, the abnormality determination processing unit 44 and the event information transfer unit 46 perform abnormality determination processing that is illustrated in FIG. 16.

In Step 330 for the abnormality determination processing, the abnormality determination processing unit 44 searches the processing server model positioning information 50 for a record in which "model ID" is consistent with "model ID" in the event information 52 that is delivered. Then, the abnormality determination processing unit 44 sets the model ID that is set to be in "common-portion model ID" in the record for the processing server model positioning information 50, which is extracted as a result of the search, to be "application model ID" indicating a model that applies to the abnormality determination processing of the event information 52 that is delivered.

It is noted that in a case where a model that corresponds to "model ID" in the event information 52 does not include a common portion, "application model ID" is consistent with "model ID" in the event information 52. On the other hand, in a case where the model that corresponds to "model ID" in the event information 52 includes a common portion and where a unique portion in the model is not positioned in the server 42 in question, a model ID of a model that is positioned in the server 42 in question, which includes the same portion in common with the model, is set to be in "application model ID".

In Step 332, the abnormality determination processing unit 44 acquires, from the model information 24 in which the model ID is consistent with "application model ID", a record in which "node ID" is consistent with "determination node ID" in the event information 52 that is delivered, as "determination node information", from the third storage unit 48. It is noted that, if a delivery source of the event information 52 is the event information delivery server 30, "determination node ID"=1 in the event information 52, but in a case where the delivery source of the event information 52 is another abnormality determination processing server 42, "determination node ID">1 in the event information 52. Therefore, in this case, continuance of the determination of the user's operation of the terminal which is performed in the abnormality determination processing server 42 that is the delivery source of the event information 52 is performed.

In Step 334 that follows, the abnormality determination processing unit 44 determines whether or not "model ID" in the event information 52 that is delivered is included in "common-portion retention model ID boundary list" in "determination node information" that is acquired in Step 332. In a case where the determination in Step 334 is negative, proceeding to Step 336 takes place. In Step 336, the abnormality determination processing unit 44 makes a condition determination that is stipulated with "determination attribute name" and "condition" in "determination node information" that is acquired. Then, in Step 338, the abnormality determination processing unit 44 determines whether or not the condition is satisfied in the condition determination that is made in Step 336.

In a case where the condition is satisfied in the condition determination, the determination in Step 338 is positive, and proceeding to Step 340 takes place. In Step 340, the abnormality determination processing unit 44 retains the node ID that is set to be in "node ID of slave node in a case where condition is satisfied" in "determination node information", as "slave node ID" in the memory 128, and proceeds to Step 344.

On the other hand, in a case where the condition is not satisfied in the condition determination, the determination in Step 338 is negative, and proceeding to Step 342 takes place. In Step S342, the abnormality determination processing unit 44 retains the node ID that is set to be in "node ID of slave node in a case where condition is not satisfied" in "determination node information", as "slave node ID", in the memory 128, and proceeds to Step 344.

In Step 344, the abnormality determination processing unit 44 determines whether or not "slave node ID" that is retained in the memory 128 is 0, 1, or any other number than 0 and 1. As described above, in the present embodiment, "node ID of a slave node"=1 is allocated to the user's operation of the terminal="normal", and "node ID=a slave node"=0 is allocated to the user's operation of the terminal="abnormal". Therefore, in the determination in Step 344, it is determined whether or not the user's operation of the terminal can be determined as "normal", whether or not the user's operation of the terminal can be determined as "abnormal", and whether or not the determination of the user's operation of the terminal is not completed, that is, whether or not the continuance of the condition determination is to be performed.

In a case where "slave node ID" that is retained in the memory 128 is any other number than 0 and 1, because the determination of the user's opration of the terminal is not completed and thus the continuance of the condition determination has to be performed, proceeding from Step 344 to Step 346 takes place. In Step 346, the abnormality determination processing unit 44 sets "slave node ID" that is retained in the memory 128, to be in "determination node ID" in the event information 52, and returns to Step 332. In this case, the determination of the user's operation of the terminal is continued.

Furthermore, in a case where "slave node ID"=1, which is retained in the memory 128, because it can be determined that the user's operation of the terminal is "normal", proceeding from Step 344 to Step 348 takes place. In Step 348, the abnormality determination processing unit 44 determines that the user's operation of the terminal is "normal", performs processing that is to be performed in normal operation, and ends the abnormality determination processing. As an example of the processing that is to be performed in normal operation, processing is given such as transmitting or storing information indicating that the determination result is "normal", in a state of being associated with "event ID" in the event information 52, to a predetermined server or in the third storage unit 48, respectively.

Furthermore, in a case where "slave node ID"=0, which is retained in the memory 128, because it can be determined that the user's operation of the terminal is "abnormal", proceeding from Step S344 to Step 350 takes place. In Step 350, the abnormality determination processing unit 44 determines that the user's operation of the terminal is "abnormal", performs processing that is to be performed in abnormal operation, and ends the abnormality determination processing. As an example of the processing that is to be performed in abnormal operation, processing is given such as transmitting information indicating that the determination result is "abnormal", in a state of being associated with "event ID" and "determination node ID" in event information 52, as alarm information, to a manager's terminal.

Furthermore, in a case where a model that corresponds to "model ID" in the event information 52 includes a common portion, where a unique portion in the model is not positioned in the server 42 in question, and where with the condition determination that is included in the common portion, it is difficult to determine the user's operation of the terminal, the determination in Step 334 is positive. In a case where the determination in Step 334 is positive, proceeding to Step 352 takes place.

In Step 352, the event information transfer unit 46 searches processing model positioning information 50 for a record in which "model ID" is consistent with "model ID" in the event information 52. Then, the event information transfer unit 46 sets the server ID that is set to be in "unique-portion positioning server ID" in the record that is extracted, as a result of the search, from the processing server model positioning information 50, to be in "unique positioning server". In Step 354 that follows, the event information transfer unit 46 delivers the event information 52 to the abnormality determination processing server 42 in "unique positioning server", of which server ID is set in Step 352, and ends the abnormality determination processing.

Figure 20:
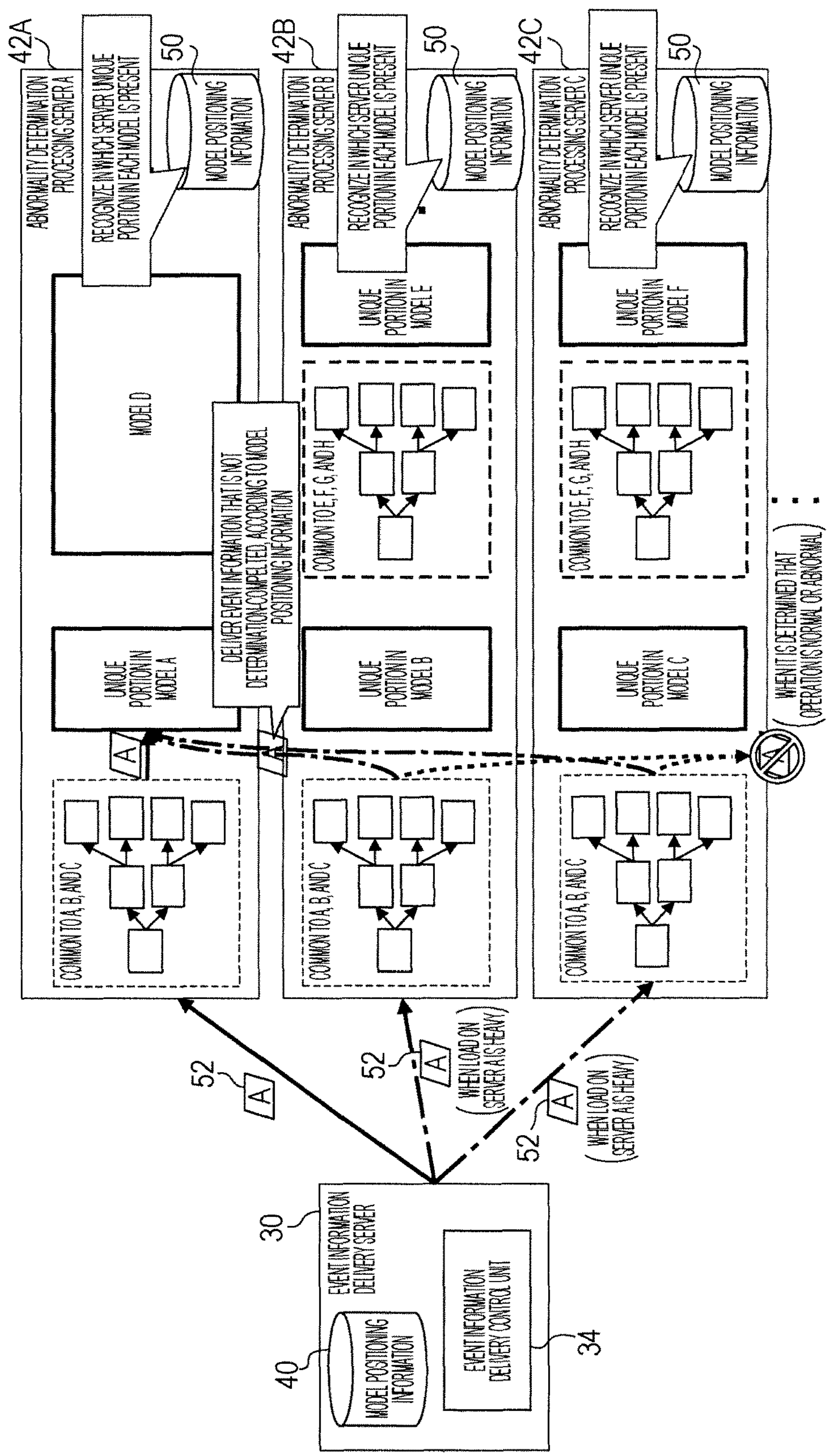
FIG. 20 is a conceptual diagram illustrating an example of a case where a certain abnormality determination processing server delivers the event information to another abnormality determination processing server with the abnormality determination processing.

FIG. 20 illustrates an example in which, by performing the abnormality determination processing described above, the event information 52 is delivered among the abnormality determination processing servers 42. In the example in FIG. 20, in the same manner as in FIG. 19, the pieces of model information 24 on the models A and D are positioned in the abnormality determination processing server 42A, the pieces of model information 24 on the models B and E are positioned in the abnormality determination processing server 42B, and the pieces of model information 24 on the models C and F are positioned in the abnormality determination processing server 42C. It is noted that also in FIG. 20, the models A to C have common portions. Furthermore, an expression of the event information 52 as "A", which is delivered from the event information delivery server 30 to the abnormality determination processing server 42, means that a model ID of the model A is set to be in "model ID" in the event information 52.

In the same manner as in FIG. 19, also in FIG. 20, in the case where the processing load on the abnormality determination processing server 42A exceeds the amount of allowance, the event information 52 in which the model ID of the model A is set to be in "model ID" is delivered to the abnormality determination processing server 426 in which the model B that has a portion in common with the model A is positioned. Alternatively, the event information 52 is delivered to the abnormality determination processing server 42C in which the model C that has a portion in common with the model A is positioned.

At this point, in a case where, in the abnormality determination processing server 42B or the abnormality determination processing server 42C to which the event information 52 is delivered, it can be determined with the condition determination within the common portion that the user's operation of the terminal is normal or abnormal, the event information 52 is not delivered among the abnormality determination processing servers 42.

On the other hand, in a case where, in the abnormality determination processing server 42B or the abnormality determination processing server 42C, with the condition determination within the common portion, it is difficult to determine the user's operation of the terminal, the event information 52 is delivered from the server 42B or the server 42C to the server 42A.

When it comes to the event information 52 that is delivered to the server 42A, because "determination node ID" is updated by the server 42B or the server 42C, the server 42A performs the continuation of the determination of the user's operation of the terminal by the server 42B or the server 42C.

FIG. 21 illustrates an example of a change in the processing load on each of the servers 42A, 42B, and 42C. As described above, in a case there the processing load on the server 42A exceeds the amount of allowance, the event information 52 to which the model A applies is delivered from a delivery server 30 to the server 42B in which the model B that has a portion in common with the model A is positioned, or the server 42C in which the model C is positioned. Accordingly, as illustrated in a hatching-emphasized manner in FIG. 21, when it comes to the processing load caused by the abnormality determination processing for the common portion in the model A, an amount of load by which the allowed processing load on the server 42A is exceeded is distributed to the server 42B or the server 42C. Furthermore, because the retention of the common portion by the models A to C is used, this distribution of the processing load can be implemented without entailing an increase in the capacity of the model information 24 that is stored in the server 42B or the server 42C.

Incidentally, it is also technically possible that a portion that is common to a plurality of models is determined and then this common portion is positioned in one processing server. FIG. 22 illustrates an example in which a common processing server 43A in which a portion that is common to the models A, B, and C is positioned, and a common processing server 43B in which a portion that is common to the models E, F, G, and H is positioned are provided. It is noted that a unique portion in the model A, unique portions of the models B and E and unique portions of the models C and F are positioned in the server 42A, the server 42B, and the server 42C, respectively. However, in the example in FIG. 22, for example, in a case where many pieces of event information 52 to which the model A applies occur, the processing load on each of the common processing server 43A and the server 42A increases, but it is difficult to distribute processing loads on other servers. This is also the same for a case where many pieces of event information 52 to which a model other than the model A applies occur.

In contrast, in the present embodiment, for example, as illustrated in FIG. 19, the models A, B, and C that have common portions are positioned in different servers 42A, 42B, and 42C, respectively, and portions that are common to the models A, B, and C are positioned in a plurality of servers 42A, 42B, and 42C, respectively. Accordingly, for example, in the case where many pieces of event information 52 to which the model A applies occur, the processing load on the server 42A increases, but processing relating to the common portion in the model A can be distributed to the servers 42B and 42C. Furthermore, even in a case where many pieces of event information 52 to which the model B or the model C applies occur, a processing load thereon can be distributed in the same manner.

In this manner, in the present embodiment, among a plurality of models that include a plurality of types of determination conditions for determining a state of an event from the event information 52 that includes an attribute relating to the event that occurs, a portion of the determination condition, which is common to models different from each other, is determined. Furthermore, one or more models, which include different models among a plurality of models that have the same common portions, are caused to be stored in a plurality of abnormality determination processing server 42, respectively, that determine the state of the event of the event information 52 to which the model that is stored in the third storage unit 48 applies, and which is a processing target. Furthermore, among a plurality of abnormality determination processing servers 42, a first abnormality determination processing server 42 is specified that stores a first model, which corresponds to the attribute that is included in the event information 52 that is input, among a plurality of models that include the same common portions, in the third storage unit 48. Furthermore, a second abnormality determination processing server 42 is specified that stores a second model, which includes a common portion that is the same as the common portion that is included in the first model, in the third storage unit 48. Then, according to the load on the first abnormality determination processing server 42, it is decided which one of the first abnormality determination processing server 42 and the second abnormality determination processing server 42 performs processing that determines the state of the event, and the decided abnormality determination processing server 42 is caused to perform the processing that determines the state of the event. Accordingly, the load on the abnormality determination processing server 42 can be distributed without increasing the storage capacity of each of the abnormality determination processing server 42 to store the model information 24.

Furthermore, in the present embodiment, a plurality of types of determination conditions that are included in the plurality of models are compared with each other, in the order in which the determination processing is performed, in a plurality of determination conditions that are included in the plurality of models, and thus the common portion is determined. The event information 52 that is input is delivered to any one abnormality determination processing server 42 that is selected according to the load on each of the first abnormality determination processing server 42 and the second abnormality determination processing server 42, of the first abnormality determination processing server 42 and the second abnormality determination processing server 42 that are specified. That is, in the abnormality determination processing server 42 that is a delivery destination of the event information 52, at least the processing of the common portion is performed, among processing operations that determine the state of the event of the event information 52. Accordingly, processing relating to the determination of the common portion and the delivery of the event information 52 is simpler than in a case where the common portion that is present while relating conditions for determining a plurality of models is determined and so forth.

Furthermore, in the present embodiment, the event information delivery server 30 adds the following pieces of information to the event information 52. The pieces of information to be added are “determination node ID” and “model ID” of the first model, and “determination node ID” in which information indicating a head determination condition is set according to the order in which the determination processing is performed in a plurality of determination conditions that are included in the first model, as determination conditions for starting the determination of the state of the event. The abnormality determination processing server 42 to which the event information 52 is delivered starts to determine the state of the event, beginning with the determination condition that is indicated by “determination node ID”, in the common portion in the first model or the second model that is stored in the third storage unit 48. Furthermore, in a case where the determination of the state of the event is not completed only with the common portion in the second model, and where a non-common portion in the first model is stored in the third storage unit 48, the event information transfer unit 46 performs the following processing. That is, the event information 52, “determination node ID” in which is updated, is transferred to the first abnormality determination processing server 42 that stores the non-common portion in the first model in the third storage unit 48. Accordingly, also in a case where the common portion and the non-common portion (the unique portion) in the model are processed in different abnormality determination processing servers 42, an interface that includes the continuance of the determination of the state of the event among the abnormality determination processing servers 42 is simple.

It is noted that the aspect where the model is positioned in the abnormality determination processing server 42 on a model-by-model basis is described above, but no limitation to this is imposed. For example, when it comes to a model that includes a common portion, the model may be positioned in the abnormality determination processing server 42 on a common-portion basis and on a unique-portion basis, and common portions of n models that include the same common portions may be positioned in abnormality determination processing servers 42, the number of which is smaller than n.

Figure 23:
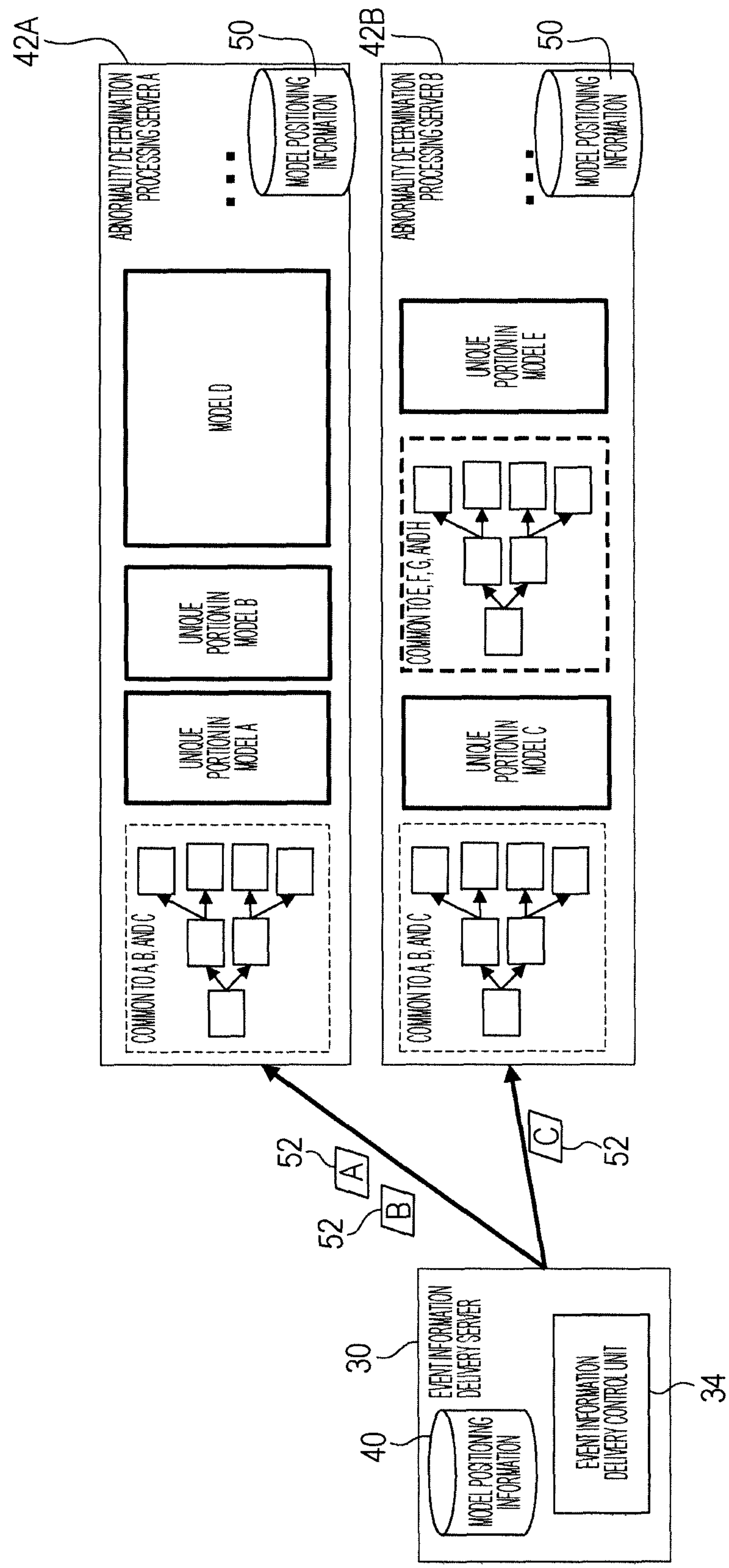
FIG. 23 is a conceptual diagram illustrating another aspect of the positioning of the model.

As an aspect, in a case where the models A to C that includes common portions, as illustrated in FIG. 23, a case is given where the common portions in the models A to C and unique portions in the models A and B are positioned in the server 42A, and where the common portions in the models A to C and the unique portion in the model C are positioned in the server 42B. This aspect, as an example, is effective in a case where it can be expected that the processing load for the abnormality determination to which the models A and b apply is comparatively smaller than the processing load for the abnormality determination to which the model C applies, and the like. According to the aspect, in a case where the load for the processing for the abnormality determination to which the model C applies is high and where the processing load on the abnormality determination processing server 42B exceeds an allowable value, the abnormality determination to which the common portions in the models A to C apply can also be performed by the abnormality determination processing server 42A. Accordingly, the load on the abnormality determination processing server 42B can be distributed.

Furthermore, an aspect that is illustrated in FIG. 23 is that common portions in n models that include the same common portions are positioned in abnormality determination processing servers 42, the number of which is smaller than n. Because of this, storage capacities of third storage units 48 of a plurality of abnormality determination processing servers 42 can be saved in their entirety. Furthermore, no limitation to the aspect described above is imposed, and as an example, as illustrated in FIG. 24, the server 42C in which only the common portions relating to the models A to C are positioned may be provided. Furthermore, common portions in n models that have the same common portions may be provided in abnormality determination processing servers 42, the number of which is greater than n.

Furthermore, the abnormality determination system 10 is described above as including the model learning server 12, the event information delivery server 30, and the plurality of abnormality determination processing servers 42, but no limitation to this is imposed. For example, one server may be caused to function as each of the model learning server 12 and the event information delivery server 30.

Furthermore, the aspect is described above in which the model learning program 80, the event information delivery program 112, and the abnormality determination processing program 142, which are an example of the load distribution control program according to the technology that is disclosed, are stored in advance (installed) in the storage units 68, 102, and 130. However, it is also possible that the load distribution control program according to the technology that is disclosed is provided in a physical form in which the load distribution control program is recorded on a recording medium, such as a CD-ROM, a DVD-ROM, or a memory card.

All documents, patent applications, and technology specifications that are described in the present specification are incorporated by reference into the present specification, to the same extent as in a case where incorporation of an individual document, patent application, and technology specification by reference is specific and individually stated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A load distribution system comprising:

a first computer configured to:

determine, from event information that includes an attribute relating to an occurrence event, a common portion of determination conditions among mutually different models, for a plurality of models that include a plurality of types of determination conditions for determining a state of the event, and store one or more models, which include different models among a plurality of models that include an identical common portion, in each of a plurality of third computers that determines a state of the event of the event information which is a processing target, by applying a model that is stored in a built-in memory; and a second computer configured to:

specify from among the plurality of third computers a first third computer that stores, in a built-in memory, a first model of the models that include the identical common portion, which corresponds to the attribute included in the event information which has been input, specify from among the plurality of third computers a second third computer that stores, in a built-in memory, a second model which includes a common portion identical to a common portion included in the first model, decide which one of the first third computer and the second third computer is caused to perform processing of determining the state of the event, according to a load on the first third computer, and cause the decided one of the third computers to perform the processing of determining the state of the event.

2. A load distribution method comprising:

by a first computer, determining from event information that includes an attribute relating to an occurrence event, a common portion of determination conditions among mutually different models, for a plurality of models that include a plurality of types of determination conditions for determining a state of the event, and storing one or more models, which include different models among a plurality of models that include an identical common portion, in each of a plurality of third computers that determines a state of the event of the event information which is a processing target, by applying a model that is stored in a built-in memory; and by a second computer, specifying from among the plurality of third computers a first third computer that stores, in a built-in memory, a first model of the models that include the identical common portion, which corresponds to the attribute included in the event information which has been input, specifying from among the plurality of third computers a second third computer that stores, in a built-in memory, a second model which includes a common portion identical to a common portion included in the first model, deciding which one of the first third computer and the second third computer is caused to perform processing of determining the state of the event, according to a load on the first third computer, and causing the decided one of the third computers to perform the processing of determining the state of the event.

3. The load distribution method according to claim 2, wherein the first computer is caused to determine the common portion by comparing the plurality of types of determination conditions included in the plurality of models in order of performing determination processing, in the plurality of determination conditions included in the plurality of models, and wherein the second computer is caused to deliver the input event information to one of the first third computer and the second third computer that is selected according to the load on the first third computer and a load on the second third computer and thus to cause the selected one of the third computers to perform at least processing of the common portion, among processing operations of determining the state of the event of the event information.

4. The load distribution method according to claim 3, wherein the second computer adds, to the event information that is delivered to the third computer, identification information of a first model and determination condition identification information in which information for indicating a determination condition on a top in the order of performing the determination processing in a plurality of determination conditions included in the first model, as a determination condition for starting the determination of the state of the event, and wherein the third computer to which the event information has been delivered starts the determination of the state of the event from the determination condition that is indicated by the determination condition identification information, in the common portion of the first model or of a second model that is stored in the built-in memory, and, in a case where the determination of the state of the event is not completed only with the common portion of the second model and where a non-common portion of the first model is not stored in the built-in memory, transfers the event information in which the determination condition identification information is updated, to the first third computer that stores the non-common portion of the first model in the built-in memory.

5. The load distribution method according to claim 1, wherein the second computer causes the common portion of the models that include the identical common portion, to be stored in the built-in memories of third computers of which a number is smaller than the number of the models that include the identical common portion, where the number of models that include the identical common portion is equal to or greater than 3.

6. A load distribution apparatus comprising:

a first computer configured to:

determine, from event information that includes an attribute relating to an occurrence event, a common portion of determination conditions among mutually different models, for a plurality of models that include a plurality of types of determination conditions for determining a state of the occurrence event, and store one or more models, which include different models among a plurality of models that include the identical common portion, in each of a plurality of third computers that determines a state of the event of the event information which is a processing target, by applying a model that is stored in a built-in memory; and a second computer configured to:

specify, from among the plurality of third computers, a first third computer that stores, in a built-in memory, a first model of the models that include the identical common portion, which corresponds to the attribute included in the event information which has been input, to specify from among the plurality of third computers a second third computer that stores, in a built-in memory, a second model which includes a common portion identical to a common portion included in the first model, to decide which one of the first third computer and the second third computer is caused to perform processing of determining the state of the event, according to a load on the first third computer, and to cause the decided one of the third computers to perform the processing of determining the state of the event.

7. A load distribution apparatus according to claim 6, wherein the first computer is caused to determine the common portion by comparing the plurality of types of determination conditions included in the plurality of models in order of performing determination processing, in the plurality of determination conditions in the plurality of models, and wherein the second computer is caused to deliver the input event information to one of the first third computer and the second third computer that is selected according to the load on the first third computer and a load on the second third computer, and thus to cause the selected one of the third computers to perform at least processing of the common portion, among processing operations of determining the state of the event of the event information.

8. The load distribution apparatus according to claim 7, wherein the second computer adds, to the event information that is delivered to the third computer, identification information of a first model and determination condition identification information in which information indicating a determination condition on a top in the order of performing the determination processing in a plurality of determination conditions included in the first model, as a determination condition for starting the determination of the state of the event, and wherein the third computer to which the event information has been delivered starts the determination of the state of the event from a determination condition that is indicated by the determination condition identification information, in the common portion of the first model or a second model that is stored in the built-in memory, and in a case where the determination of the state of the event is not completed only with the common portion of the second model and where a non-common portion in the first model is not stored in the built-in memory, transfers the event information in which the determination condition identification information is updated, to the first third computer that stores the non-common portion in the first model in the built-in memory.

9. The load distribution apparatus according to claim 6, wherein the second computer causes the common portions of the models that include the identical common portion, to be stored in the built-in memories of third computers of which a number is smaller than the number of the models that include the identical common portion, in a case where the number of models that include the identical common portion is equal to or greater than 3.

* * * * *